US006512053B1

(12) United States Patent
Colvin et al.

(10) Patent No.: US 6,512,053 B1
(45) Date of Patent: Jan. 28, 2003

(54) EMULSION STYRENE-BUTADIENE RUBBER

(75) Inventors: Howard Allen Colvin, Akron, OH (US); Michael Leslie Senyek, Jr., Tallmadge, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/176,314

(22) Filed: Jun. 20, 2002

Related U.S. Application Data

(62) Division of application No. 09/915,246, filed on Jul. 25, 2001, now Pat. No. 6,455,655.
(60) Provisional application No. 60/236,291, filed on Sep. 28, 2000.

(51) Int. Cl.$^7$ .............................................. C08F 236/10
(52) U.S. Cl. ..................... 525/243; 525/194; 525/223; 525/227; 525/232; 525/236; 525/237; 525/241
(58) Field of Search ............................. 525/194, 223, 525/227, 232, 236, 237, 241, 243

(56) References Cited

U.S. PATENT DOCUMENTS

| | | | | |
|---|---|---|---|---|
| 4,205,153 A | * | 5/1980 | Weinstein | 526/292 |
| 4,471,093 A | * | 9/1984 | Furukawa et al. | 525/237 |
| 5,534,568 A | * | 7/1996 | Schulz et al. | 524/69 |
| 5,583,173 A | * | 12/1996 | Gujarathi et al. | 524/458 |
| 6,136,899 A | * | 10/2000 | Lewandowski et al. | 524/71 |

FOREIGN PATENT DOCUMENTS

EP 0 942 042 A2 * 9/1999

* cited by examiner

*Primary Examiner*—Helen L. Pezzuto
(74) *Attorney, Agent, or Firm*—Alvin T. Rockhill

(57) ABSTRACT

This invention discloses an emulsion styrene-butadiene rubber (SBR) that can be employed in manufacturing tire tread formulations that have rolling resistance and treadwear characteristics that are similar to those made with solution SBR but with improved traction characteristics. Thus, the emulsion SBR of this invention is superior in many respects for use in tire tread compounds to conventional solution SBR and conventional emulsion SBR. This invention more specifically discloses a styrene-butadiene rubber composition which is comprised of repeat units which are derived from styrene, 1,3-butadiene, and a hydroxy alkyl acrylate monomer, wherein the styrene-butadiene rubber composition has a number average molecular weight as determined by field flow fractionation which is within the range of about 50,000 to 150,000, and wherein the styrene-butadiene rubber has a light scattering to refractive index ratio which is within the range of 1.8 to 3.9. The subject invention further reveals a styrene-butadiene rubber composition which is comprised of repeat units which are derived from styrene, 1,3-butadiene, and a hydroxy alkyl acrylate monomer, wherein a plot of log frequency versus elastic modulus of the styrene-butadiene rubber composition crosses over a plot of log frequency versus loss modulus of the styrene-butadiene rubber composition at a frequency within the range of 0.001 radians per second to 100 radians per second when conducted at 120° C. using parallel plate geometry in the dynamic oscillation frequency sweep of the styrene-butadiene rubber. The hydroxy alkyl acrylate monomer is preferably hydroxypropylmethacrylate.

20 Claims, No Drawings

EMULSION STYRENE-BUTADIENE RUBBER

This is divisional of U.S. patent application Ser. No. 09/915,246, filed on Jul. 25, 2001, U.S. Pat. No. 6,455,655 which claims the benefit of U.S. Provisional Application Serial No. 60/236,291, filed on Sep. 28, 2000.

BACKGROUND OF THE INVENTION

A wide variety of rubber products are made with styrene-butadiene rubber (SBR). For instance, large quantities of SBR are utilized in manufacturing tires for automobiles, trucks, aircraft and other types of vehicles. SBR is commonly used in manufacturing tires because it generally improves traction characteristics.

SBR can be synthesized by utilizing either solution or emulsion polymerization techniques. SBR made by emulsion polymerization (emulsion SBR) generally exhibits better traction characteristics in tire tread compounds. However, SBR made by solution polymerization (solution SBR) typically exhibits much better rolling resistance and treadwear characteristics in tire treads. For this reason, solution SBR is often considered to be preferable to emulsion SBR and currently sells at a premium price to emulsion SBR.

In the synthesis of SBR by solution polymerization techniques, an organic solvent is used which is capable of dissolving the monomers (1,3-butadiene and styrene), SBR and the polymerization catalyst or initiator. As the polymerization proceeds, a solution of the SBR in the solvent is produced. This polymer solution is sometimes referred to as a "polymer cement." The SBR is subsequently recovered from the polymer cement and can then be employed as a dry rubber in desired applications; such as, in formulating tire tread rubbers.

Typical emulsion systems employed in the synthesis of SBR contain water, an emulsifier (soap), a free radical generator, styrene monomer and 1,3-butadiene monomer. For example, in free radical emulsion polymerization systems, radicals can be generated by the decomposition of peroxides or peroxydisulfides.

Commonly employed initiators include t-butyl hydroperoxide, pinane hydroperoxide, para-menthane hydroperoxide, potassium peroxydisulfate ($K_2S_2O_8$), benzoyl peroxide, cumene hydroperoxide and azobisisobutyronitrile (AIBN). These compounds are thermally unstable and decompose at a moderate rate to release free radicals. The combination of potassium peroxydisulfate with a mercaptan such as dodecyl mercaptan is commonly used to polymerize butadiene and SBR. In hot recipes, the mercaptan has the dual function of furnishing free radicals through reaction with the peroxydisulfate and also of limiting the molecular weight of polymer by reacting with one growing chain to terminate it and to initiate growth of another chain. This use of mercaptan as a chain transfer agent or modifier is of great commercial importance in the manufacture of SBR in emulsion since it allows control of the toughness of the rubber which otherwise may limit processibility in the factory.

A standard polymerization recipe agreed on for industrial use is known as the "mutual," "standard," "GR-S" or "hot" recipe. This standard polymerization recipe contains the following ingredients (based upon parts by weight): 75.0 parts of 1,3-butadiene, 25 parts of styrene, 0.5 parts of n-dodecyl mercaptan, 0.3 parts of potassium peroxydisulfate, 5.0 parts of soap flakes and 180.0 parts of water.

When this standard recipe is employed in conjunction with a polymerization temperature of 50° C., the rate of conversion to polymer occurs at 5–6 percent per hour. Polymerization is terminated at 70–75 percent conversion since high conversions led to polymers with inferior physical properties, presumably because of crosslinking in the latex particle to form microgel or highly branched structures. This termination is effected by the addition of a "shortstop" such as hydroquinone (about 0.1 part by weight) which reacts rapidly with radicals and oxidizing agents. Thus, the shortstop destroys any remaining initiator and also reacts with polymer-free radicals to prevent formation of new chains. The unreacted monomers are then removed; first, the butadiene by flash distillation at atmospheric pressure, followed by reduced pressure and then the styrene by steam-stripping in a column.

A dispersion of antioxidant is typically added (1.25 parts) to protect the SBR from oxidation. The latex can then be partially coagulated (creamed) by the addition of brine and then fully coagulated with dilute sulfuric acid or aluminum sulfate. The coagulated crumb is then washed, dried and baled for shipment. One of the first major improvements on the basic process was the adoption of continuous processing. In such a continuous process, the styrene, butadiene, soap, initiator and activator (an auxiliary initiating agent) are pumped continuously from storage tanks into and through a series of agitated reactors maintained at the proper temperature at a rate such that the desired degree of conversion is reached at the exit of the last reactor. Shortstop is then added, the latex is warmed by the addition of steam and the unreacted butadiene is flashed off. Excess styrene is then steam-stripped off and the latex is finished, often by blending with oil, creaming, coagulating, drying and bailing.

For further details on SBR and the "standard recipe," see The Vanderbilt Rubber Handbook, George G Winspear (Editor), R T Vanderbilt Company, Inc (1968) at pages 34–57.

U.S. Pat. No. 5,583,173 discloses a process for preparing a latex of styrene-butadiene rubber which comprises (1) charging water, a soap system, a free radical generator, 1,3-butadiene monomer and styrene monomer into a first polymerization zone; (2) allowing the 1,3-butadiene monomer and the styrene monomer to copolymerize in the first polymerization zone to a monomer conversion which is within the range of about 15 percent to about 40 percent to produce a low conversion polymerization medium; (3) charging the low conversion polymerization medium into a second polymerization zone; (4) charging an additional quantity of 1,3-butadiene monomer and an additional quantity of styrene monomer into the second polymerization zone; (5) allowing the copolymerization to continue until a monomer conversion of at least about 50 percent is attained to produce the latex of styrene-butadiene rubber. This process is sometimes referred to as the FIM (feed-injection-monomer) process.

By employing the technique disclosed in U.S. Pat. No. 5,583,173, the amount of soap required to produce styrene-butadiene rubber by emulsion polymerization can be reduced by greater than 30 percent. This is advantageous because it reduces costs and is environmentally attractive. U.S. Pat. No. 5,583,173 also reports that the styrene-butadiene rubber produced by the process described therein offers advantages in that it contains lower quantities of residual soap. This reduces fatty acid bloom characteristics in final products, such as tires, and makes plies easier to adhere together during tire building procedures.

SUMMARY OF THE INVENTION

This invention discloses a technique for greatly improving the physical properties of emulsion SBR. In fact, the emulsion SBR of this invention can be employed in manufacturing tire tread formulations that have traction and treadwear characteristics that are similar to those made with solution SBR without compromising traction characteristics. Thus, the emulsion SBR of this invention is superior in many respects for use in tire tread compounds to conventional solution SBR and conventional emulsion SBR. This is, of course, because the improved emulsion SBR of this invention can be employed in making tire tread compounds that exhibit greatly improved treadwear characteristics and rolling resistance while maintaining outstanding traction characteristics. In other words, the emulsion SBR of this invention has improved characteristics for utilization in tire tread rubber formulations.

The improved emulsion SBR of this invention can be made by blending the emulsion of a high molecular weight SBR with the emulsion of a low molecular weight SBR and co-coagulating the latex blend. The improved emulsion SBR of this invention can made by blending the emulsion of a high molecular weight SBR made by the FIM process with the emulsion of a low molecular weight SBR made by the FIM process and co-coagulating the latex blend. The high molecular weight SBR will typically have a number average molecular weight which is within the range of about 200,000 to about 1,000,000 and a weight average molecular weight which is within the range of about 300,000 to 1,000,000. The low molecular weight SBR will typically have a number average molecular weight which is within the range of abut 20,000 to about 150,000 and a weight average molecular weight which is within the range of about 40,000 to about 280,000. It is critical for the high molecular weight SBR to have a bound styrene content which differs from the bound styrene content of the low molecular weight SBR by at least 5 percentage points. The high molecular weight SBR will typically have a bound styrene content which differs from the bound styrene content of the low molecular weight SBR by at least 10 percentage points and preferably at least 15 percentage points.

The subject invention further reveals a styrene-butadiene rubber composition which is comprised of repeat units which are derived from styrene and 1,3-butadiene, wherein the styrene-butadiene rubber composition has a number average molecular weight as determined by field flow fractionation which is with in the range of about 50,000 to 150,000, and wherein the styrene-butadiene rubber has a light scattering to refractive index ratio which is within the range of 1.8 to 3.9.

The subject invention further reveals a styrene-butadiene rubber composition which is comprised of repeat units which are derived from styrene and 1,3-butadiene, wherein a plot of frequency versus elastic modulus of the styrene-butadiene rubber composition crosses over a plot of log frequency versus loss modulus of the styrene-butadiene rubber composition at a frequency within the range of 0.001 radians per second to 100 radians per second when conducted at 120° C. using parallel plate geometry in the dynamic oscillation frequency sweep of the styrene-butadiene rubber.

The subject invention further reveals a styrene-butadiene rubber composition which is comprised of repeat units which are derived from styrene and 1,3-butadiene, wherein a plot of frequency versus elastic modulus of the styrene-butadiene rubber composition crosses over a plot of log frequency versus loss modulus of the styrene-butadiene rubber composition at a frequency within the range of 0.001 radians per second to 100 radians per second when conducted at 120° C. using parallel plate geometry in the dynamic oscillation frequency sweep of the styrene-butadiene rubber, wherein the styrene-butadiene rubber composition has a number average molecular weight as determined by field flow fractionation which is within the range of about 50,000 to 150,000 and wherein the styrene-butadiene rubber has a light scattering to refractive index ratio which is within the range of 1.8 to 3.9.

The present invention also discloses an emulsion styrene-butadiene rubber composition which is made by a process which comprises coagulating a latex composition which is comprised of (a) water, (b) an emulsifier, (c) a high molecular weight styrene-butadiene rubber having a weight average molecular weight of at least about 300,000 and (d) a low molecular weight styrene-butadiene rubber having a weight average molecular weight of less than about 280,000; wherein the ratio of the high molecular weight styrene-butadiene rubber to the low molecular weight styrene-butadiene rubber is within the range of about 80:20 to about 25:75; and wherein the bound styrene content of the high molecular weight styrene-butadiene rubber differs from the bound styrene content of the low molecular weight styrene-butadiene rubber by at least 5 percentage points.

The subject invention further reveals a styrene-butadiene rubber composition which is comprised of repeat units which are derived from styrene and 1,3-butadiene, wherein said styrene-butadiene rubber composition has a tan delta at 0° C. which is within the range of 0.13 to 0.19 and a tan delta at 60° C. which is within the range of 0.06 to 0.12 after being cured in a rubber blend containing 70 parts by weight of the styrene-butadiene rubber, 30 parts by weight of high cis-1,4-polybutadiene rubber, 7.5 parts by weight of highly aromatic processing oil, 70 parts by weight of N220 carbon black, 2 parts by weight of zinc oxide, 0.8 parts by weight of a paraffin wax, 3 parts by weight of a microcrystalline wax, 1.15 parts by weight of para-phenylene diamine antioxidant, 1.2 parts by weight of N-cyclohexyl-2-benzothiazole sulfenamide, 0.3 parts by weight of tetramethyl thiuram disulfide and 1.45 parts by weight of sulfur.

The present invention also discloses a styrene-butadiene rubber composition which is comprised of repeat units which are derived from styrene and 1,3-butadiene, wherein said styrene-butadiene rubber composition has a tan delta at 0° C. which is within the range of 0.18 to 0.40 and a tan delta at 60° C. which is within the range of 0.09 to 0.16 after being cured in a rubber blend containing 70 parts by weight of the styrene-butadiene rubber, 30 parts by weight of high cis-1,4-polybutadiene rubber, 7.5 parts by weight of highly aromatic processing oil, 70 parts by weight of N220 carbon black, 2 parts by weight of zinc oxide, 0.8 parts by weight of a paraffin wax, 3 parts by weight of a microcrystalline wax, 1.15 parts by weight of Wingstay® 100 antioxidant, 1.2 parts by weight of N-cyclohexyl-2-benzothiazole sulfenamide, 0.3 parts by weight of tetramethyl thiuram disulfide and 1.45 parts by weight of sulfur.

The subject invention further reveals a tire which is comprised of a generally toroidal-shaped carcass with an outer circumferential tread, two spaced beads, at least one ply extending from bead to bead and sidewalls extending radially from and connecting said tread to said beads; wherein said tread is adapted to be ground-contacting; wherein the tread is comprised of an emulsion styrene-butadiene rubber composition which is made by a process which comprises coagulating a latex composition which is comprised of (a) water, (b) an emulsifier, (c) a high molecular weight styrene-butadiene rubber having a weight average molecular weight of at least about 300,000 and (d) a low molecular weight styrene-butadiene rubber having a weight average molecular weight of less than about 280,000; wherein the ratio of the high molecular weight styrene-butadiene rubber to the low molecular weight styrene-butadiene rubber is within the range of about 80:20 to about 25:75; and wherein the bound styrene content of the high molecular weight styrene-butadiene rubber differs from the bound styrene content of the low molecular weight styrene-butadiene rubber by at least 5 percentage points.

The present invention further reveals a tire which is comprised of a generally toroidal-shaped carcass with an outer circumferential tread, two spaced beads, at least one ply extending from bead to bead and sidewalls extending radially from and connecting said tread to said beads; wherein said tread is adapted to be ground-contacting; wherein the tread is comprised of an emulsion styrene-butadiene rubber composition which is comprised of repeat units which are derived from styrene and 1,3-butadiene, wherein a plot of frequency versus elastic modulus of the styrene-butadiene rubber composition crosses over a plot of log frequency versus loss modulus of the styrene-butadiene rubber composition at a frequency within the range of 0.001 radians per second to 100 radians per second when conducted at 120° C. using parallel plate geometry in the dynamic oscillation frequency sweep of the styrene-butadiene rubber, wherein the styrene-butadiene rubber composition has a number average molecular weight as determined by field flow fractionation which is within the range of about 50,000 to 150,000 and wherein the styrene-butadiene rubber has a light scattering to refractive index ratio which is within the range of 1.8 to 3.9.

The subject invention further reveals a tire which is comprised of a generally toroidal-shaped carcass with an outer circumferential tread, two spaced beads, at least one ply extending from bead to bead and sidewalls extending radially from and connecting said tread to said beads; wherein said tread is adapted to be ground-contacting; wherein the tread is comprised of an emulsion styrene-butadiene rubber composition which is comprised of repeat units which are derived from styrene and 1,3-butadiene, wherein a plot of frequency versus elastic modulus of the styrene-butadiene rubber composition crosses over a plot of log frequency versus loss modulus of the styrene-butadiene rubber composition at a frequency within the range of 0.001 radians per second to 100 radians per second when conducted at 120° C. using parallel plate geometry in the dynamic oscillation frequency sweep of the styrene-butadiene rubber.

The present invention also discloses a tire which is comprised of a generally toroidal-shaped carcass with an outer circumferential tread, two spaced beads, at least one ply extending from bead to bead and sidewalls extending radially from and connecting said tread to said beads; wherein said tread is adapted to be ground-contacting; wherein the tread is comprised of an emulsion styrene-butadiene rubber composition which is made by a process which comprises coagulating a latex composition which is comprised of (a) water, (b) an emulsifier, (c) a high molecular weight styrene-butadiene rubber having a weight average molecular weight of at least about 300,000 and (d) a low molecular weight polybutadiene rubber having a weight average molecular weight of less than about 280,000; wherein the ratio of the high molecular weight styrene-butadiene rubber to the low molecular weight polybutadiene rubber is within the range of about 80:20 to about 25:75; and wherein the bound styrene content of the high molecular weight styrene-butadiene rubber is at least about 10 weight percent.

The subject invention further reveals a tire which is comprised of a generally toroidal-shaped carcass with an outer circumferential tread, two spaced beads, at least one ply extending from bead to bead and sidewalls extending radially from and connecting said tread to said beads; wherein said tread is adapted to be ground-contacting; wherein the tread is comprised of an emulsion styrene-butadiene rubber composition which is made by a process which comprises a latex composition which is comprised of (a) water, (b) an emulsifier, (c) a high molecular weight polybutadiene rubber having a weight average molecular weight of at least about 300,000 and (d) a low molecular weight styrene-butadiene rubber having a weight average molecular weight of less than about 280,000; wherein the ratio of the high molecular weight polybutadiene rubber to the low molecular weight styrene-butadiene rubber is within the range of about 80:20 to about 25:75; and wherein the bound styrene content of the low molecular weight styrene-butadiene rubber is at least about 10 weight percent.

The present invention also discloses an emulsion styrene-butadiene rubber composition which is made by a process which comprises coagulating a latex composition which is comprised of (a) water, (b) an emulsifier, (c) a high molecular weight styrene-butadiene rubber having a weight average molecular weight of at least about 300,000 and (d) a low molecular weight polybutadiene rubber having a weight average molecular weight of less than about 280,000; wherein the ratio of the high molecular weight styrene-butadiene rubber to the low molecular weight polybutadiene rubber is within the range of about 80:20 to about 25:75; and wherein the bound styrene content of the high molecular weight styrene-butadiene rubber is at least about 10 weight percent.

The present invention further discloses an emulsion styrene-butadiene rubber composition which is made by a process which comprises coagulating a latex composition which is comprised of (a) water, (b) an emulsifier, (c) a high molecular weight polybutadiene rubber having a weight average molecular weight of at least about 300,000 and (d) a low molecular weight styrene-butadiene rubber having a weight average molecular weight of less than about 280,000; wherein the ratio of the high molecular weight polybutadiene rubber to the low molecular weight styrene-butadiene rubber is within the range of about 80:20 to about 25:75; and wherein the bound styrene content of the low molecular weight styrene-butadiene rubber is at least about 10 weight percent.

The present invention further reveals a styrene-butadiene rubber composition which is comprised of repeat units which are derived from styrene, 1,3-butadiene, and a hydroxy alkyl acrylate monomer, wherein the styrene-butadiene rubber composition has a number average molecular weight as determined by field flow fractionation which is within the range of about 50,000 to 150,000, and wherein the styrene-butadiene rubber has a light scattering to refractive index ratio which is within the range of 1.8 to 3.9.

The subject invention also discloses a styrene-butadiene rubber composition which is comprised of repeat units which are derived from styrene, 1,3-butadiene, a hydroxy alkyl acrylate monomer, wherein a plot of log frequency versus elastic modulus of the styrene-butadiene rubber composition crosses over a plot of log frequency versus loss modulus of the styrene-butadiene rubber composition at a frequency within the range of 0.001 radians per second to 100 radians per second when conducted at 90° C. to 120° C. using parallel plate geometry in the dynamic oscillation frequency sweep of the styrene-butadiene rubber.

The present invention also reveals an emulsion styrene-butadiene rubber composition which is made by a process which comprises coagulating a latex composition which is comprised of (a) water, (b) an emulsifier, (c) a high molecular weight styrene-butadiene rubber having a weight average molecular weight of at least about 300,000 and (d) a low molecular weight styrene-butadiene rubber having a weight average molecular weight of less than about 280,000; wherein the ratio of the high molecular weight styrene-butadiene rubber to the low molecular weight styrene-butadiene rubber is within the range of about 80:20 to about 25:75; wherein the bound styrene content of the high molecular weight styrene-butadiene rubber differs from the bound styrene content of the low molecular weight styrene-butadiene rubber by at least 5 percentage points; and wherein the high molecular weight styrene butadiene rubber and/or the low molecular weight styrene butadiene rubber contain repeat units that are derived from a hydroxy alkyl acrylate monomer.

The subject invention further discloses an emulsion styrene-butadiene rubber composition which is made by a process which comprises coagulating a latex composition which is comprised of (a) water, (b) an emulsifier, (c) a high molecular weight styrene-butadiene rubber having a weight average molecular weight of at least about 300,000 and (d) a low molecular weight polybutadiene rubber having a weight average molecular weight of less than about 280,000; wherein the ratio of the high molecular weight styrene-butadiene rubber to the low molecular weight polybutadiene rubber is within the range of about 80:20 to about 25:75; wherein the bound styrene content of the high molecular weight styrene-butadiene rubber is at least about 10 weight percent; and wherein the high molecular weight styrene butadiene rubber and/or the low molecular weight styrene butadiene rubber contain repeat units that are derived from a hydroxy alkyl acrylate monomer.

The present invention also reveals a tire which is comprised of a generally toroidal-shaped carcass with an outer circumferential tread, two spaced beads, at least one ply extending from bead to bead and sidewalls extending radially from and connecting said tread to said beads; wherein said tread is adapted to be ground-contacting; wherein the tread is comprised of an emulsion styrene-butadiene rubber composition which is comprised of repeat units which are derived from styrene, 1,3-butadiene, and a hydroxy alkyl acrylate monomer, wherein a plot of frequency versus elastic modulus of the styrene-butadiene rubber composition crosses over a plot of log frequency versus loss modulus of the styrene-butadiene rubber composition at a frequency within the range of 0.001 radians per second to 100 radians per second when conducted at 120° C. using parallel plate geometry in the dynamic oscillation frequency sweep of the styrene-butadiene rubber.

The subject invention also discloses a tire which is comprised of a generally toroidal-shaped carcass with an outer circumferential tread, two spaced beads, at least one ply extending from bead to bead and sidewalls extending radially from and connecting said tread to said beads; wherein said tread is adapted to be ground-contacting; wherein the tread is comprised of an emulsion styrene-butadiene rubber composition which is made by coagulating a latex which is comprised of (a) water, (b) an emulsifier, (c) a high molecular weight polybutadiene rubber having a weight average molecular weight of at least about 300,000 and (d) a low molecular weight styrene-butadiene rubber having a weight average molecular weight of less than about 280,000; wherein the ratio of the high molecular weight polybutadiene rubber to the low molecular weight styrene-butadiene rubber is within the range of about 80:20 to about 25:75; and wherein the bound styrene content of the low molecular weight styrene-butadiene rubber is at least about 10 weight percent; and wherein the high molecular weight styrene butadiene rubber and/or the low molecular weight styrene butadiene rubber contain repeat units that are derived from a hydroxy alkyl acrylate monomer.

DETAILED DESCRIPTION OF THE INVENTION

The styrene-butadiene rubber of this invention is made by synthesizing a high molecular weight SBR and a low molecular weight SBR by free radical emulsion polymerization. The styrene-butadiene rubber of this invention can be made by synthesizing a high molecular weight SBR and a low molecular weight SBR utilizing the general free radical emulsion polymerization technique described in U.S. Pat. No. 5,583,173. This polymerization technique is known as the FIM process (feed-injection-monomer). The latex of the high molecular weight SBR and the latex of the low molecular weight SBR are then blended and co-coagulated.

The FIM process is carried out by adding styrene monomer, 1,3-butadiene monomer, water, a free radical generator and a soap system to a first polymerization zone to form an aqueous polymerization medium. The first polymerization zone will normally be a reactor or series of two or more reactors. Copolymerization of the monomers is initiated with the free radical generator. This copolymerization reaction results in the formation of a low conversion polymerization medium.

At the point where the low conversion polymerization medium reaches a monomer conversion which is within the range of about 15 percent to about 40 percent, the low conversion polymerization medium is charged into a second polymerization zone. The second polymerization zone can be a reactor or a series of two or more reactors. In any case, the second polymerization zone is subsequent to the first polymerization zone. The low conversion polymerization medium will normally be charged into the second polymerization zone at a monomer conversion level which is within the range of about 17 percent to about 35 percent. It will more preferably be charged into the second polymerization zone at a level of monomer conversion which is within the range of 20 percent to 30 percent.

Additional styrene monomer and butadiene monomer are charged into the second polymerization zone. Normally, from about 20 percent to about 50 percent of the total amount of styrene monomer and 1,3-butadiene monomer will be charged into the second polymerization zone (from 50 percent to 80 percent of the total monomers are charged into the first polymerization zone). It is normally preferred to charge from about 30 weight percent to about 45 weight percent of the total quantity of monomers charged into the second polymerization zone (from 55 percent to 70 percent of the total monomers charged will be charged into the first polymerization zone). It is generally most preferred to charge from about 35 weight percent to about 42 weight percent of the total quantity of monomers charged into the second polymerization zone (from 58 percent to 65 percent of the total monomers charged will be charged into the first polymerization zone). By splitting the monomer charge between the first polymerization zone and the second polymerization zone, the total quantity of soap required to provide a stable latex is reduced by at least about 30 percent.

The copolymerization in the second polymerization zone is allowed to continue until a monomer conversion of at least 50 percent is attained. The copolymerization will preferably be allowed to continue until a total monomer conversion which is within the range of 50 percent to 68 percent is realized. More preferably, the copolymerization in the second reaction zone will be allowed to continue until a monomer conversion of 58 percent to 65 percent is reached.

In synthesizing the SBR latex, generally from about 1 weight percent to about 50 weight percent styrene and from about 50 weight percent to about 99 weight percent 1,3-butadiene are copolymerized. However, it is contemplated that various other vinyl aromatic monomers can be substituted for the styrene in the SBR. For instance, some representative examples of vinyl aromatic monomers that can be substituted for sytrene and copolymerized with 1,3-butadiene in accordance with this invention include 1-vinylnaphthalene, 3-methylstyrene, 3,5-diethylstyrene, 4-propylstyrene, 2,4,6-trimethylstyrene, 4-dodecylstyrene, 3-methyl-5-normal-hexylstyrene, 4-phenylstyrene, 2-ethyl-4-benzylstyrene, 3,5-diphenylstyrene, 2,3,4,5-tetraethylstyrene, 3-ethyl-1-vinylnaphthalene, 6-isopropyl-1-vinylnaphthalene, 6-cyclohexyl-1-vinylnaphthalene, 7-dodecyl-2-vinylnaphthalene, á-methylstyrene and the like. The high molecular weight SBR will typically contain from about 5 weight percent to about 50 weight percent bound styrene and from about 50 weight percent to about 95 weight percent bound butadiene.

It is typically preferred for the high molecular weight SBR to contain from about 20 weight percent to about 30 weight percent styrene and from about 70 weight percent to about 80 weight percent 1,3-butadiene. It is normally most preferred for high molecular weight SBR to contain from about 22 weight percent to about 28 weight percent styrene and from about 72 weight percent to about 78 weight percent 1,3-butadiene. Like ratios of styrene, monomer and butadiene monomer will accordingly be charged into the first polymerization zone and the second polymerization zone.

The low molecular weight SBR will normally contain from about 1 weight percent to about 50 weight percent styrene and from about 50 weight percent to about 99 weight percent 1,3-butadiene. In some cases, for instance where low rolling resistance and excellent treadwear characteristics are desired, it will be desirable for the low molecular weight SBR to contain a relatively small amount of styrene which is within the range of about 3 weight percent to about 10 weight percent with the amount of 1,3-butadiene in the SBR being within the range of about 90 weight percent to about 97 weight percent. Even lower amounts of bound styrene can be included in the low molecular weight polymer. For instance, the low molecular weight rubbery polymer can contain from 0 weight percent to 3 weight percent bound styrene and from 97 weight percent to 100 weight percent bound butadiene. Thus, in the most extreme case, polybutadiene can be used as one of the polymeric components of the blend. In other cases, for instance, in situations where high traction characteristics are desired, a much higher level of styrene will be incorporated into the low molecular weight SBR. In such cases, it is preferred for low molecular weight SBR to contain from about 40 weight percent to about 50 weight percent styrene and from about 50 weight percent to about 60 weight percent 1,3-butadiene. Like ratios of styrene monomer and butadiene monomer will accordingly be charged into the first polymerization zone and the second polymerization zone.

It is critical for the high molecular weight SBR to have a bound styrene content which differs from the bound styrene content of the low molecular weight SBR by at least 5 percentage points. The high molecular weight SBR will normally have a bound styrene content which differs from the bound styrene content of the low molecular weight SBR by 5 to 40 percentage points. The high molecular weight SBR will typically have a bound styrene content which differs from the bound styrene content of the low molecular weight SBR by at least 10 percentage points. In most cases the high molecular weight SBR will have a bound styrene content which differs from the bound styrene content of the low molecular weight SBR by 10 to 30 percentage points with a difference of 15 to 25 percentage points being most typical. It is normally preferred for the high molecular weight SBR to have a bound styrene content which differs from the bound styrene content of the low molecular weight SBR by at least 15 percentage points with a difference of at least 20 percentage points being most preferred.

It should be understood that either the high molecular weight or the low molecular weight SBR can have the higher bound styrene content. In other words, the SBR in the blend having the higher bound styrene content can be either the low or the high molecular weight polymer in the blend. It should also be understood that polybutadiene (which contains 0 percent bound styrene) can be used as one of the polymers in the blend. In such cases the polybutadiene can be either the high or the low molecular weight polymer. In cases where polybutadiene is used as one of the rubbery polymers in the blend, the SBR in the blend will typically have a bound styrene content of at least about 10 weight percent. In such cases the SBR in the blend will more typically have a bound styrene content of at least about 15 weight percent and will most preferable have a bound styrene content of at least about 20 weight percent.

In a preferred embodiment of this invention a hydroxy alkyl acrylate monomer is included in the high molecular weight SBR, the low molecular weight SBR, or both the high molecular weight SBR and the low molecular weight SBR. The hydroxy alkyl acrylate monomer will typically be incorporated into the high molecular weight SBR. In any case, the bound hydroxy alkyl acrylate monomer in the SBR will typically be present at a level which is within the range of about 0.1 weight percent to about 15 weight percent. The hydroxy alkyl acrylate monomer will more typically be included at a level which is within the range of about 0.5 weight percent to about 10 weight percent. The hydroxy alkyl acrylate monomer will preferably be included at a level which is within the range of about 1 weight percent to about 8 weight percent. The hydroxy alkyl acrylate monomer will more preferably be included at a level which is within the range of about 3 weight percent to about 5 weight percent. In cases where a hydroxy alkyl acrylate monomer is included in the SBR the level of bound 1,3-butadiene in the SBR is adjusted by a similar amount.

The hydroxy alkyl acrylate monomers that can be used typically have a structural formula selected from the group consisting of:

(1)

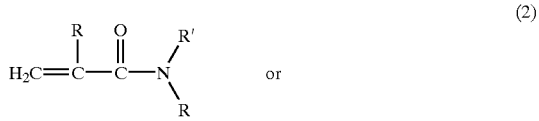

(2)

or

-continued

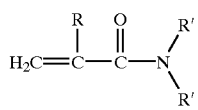
(3)

wherein R represents hydrogen atoms or an alkyl groups containing from 1 to about 8 carbon atoms, and wherein R' represents hydroxyalkyl groups containing from about 2 to about 8 carbon atoms. It is preferred for R to be a hydrogen atom or an alkyl group containing from 1 to about 4 carbon atoms. It to more preferred for R to be a hydrogen atom or a methyl group. It is most preferred for R to represent a methyl group.

It is preferred for R' to represent a hydroxyalkyl group containing from about 2 to about 4 carbon atoms. It is more preferred for R' to be a hydroxypropyl group.

Some representative hydroxy alkyl acrylate monomers that can be used include 2-hydroxyethyl (meth)acrylate, 2-hydroxypropyl (meth)-acrylate, 3-hydroxypropyl (meth) acrylate, 3-chloro-2-hydroxypropyl (meth)acrylate, 3-phenoxy-2-hydroxypropyl (meth)acrylate, glycerol mono (meth)acrylate, hydroxybutyl (meth)acrylate, 3-chloro-2-hydroxypropyl (meth)-acrylate, hydroxyhexyl (meth) acrylate, hydroxyoctyl (meth)acrylate, hydroxymethyl (meth)acrylamide, 2-hydroxyethyl(meth)acrylamide, 2-hydroxypropyl(meth)-acrylamide, 3-hydroxypropyl (meth)acrylamide, di-(ethyl-ene glycol) itaconate, di-(propylene glycol) itaconate, bis(2-hydroxypropyl) itaconate, bis(2-hydroxyethyl) itaconate, bis(2-hydroxyethyl) fumarate, bis(2-hydroxy-ethyl) maleate, and hydroxy-methyl vinyl ketone. The preferred hydroxy alkyl acrylate monomers are hydroxymethyl (meth)acrylate, 2-hydroxyethyl(meth)-acrylate, 2-hydroxypropyl (meth) acrylate, 3-hydroxy-propyl (meth)acrylate, 3-phenoxy-2-hydroxypropyl (meth)acrylate, glycerol mono(meth) acrylate, hydroxy-butyl (meth)acrylate, hydroxyhexyl (meth)acrylate, hydroxyoctyl (meth)acrylate, hydroxymethyl(meth)acryl-amide, 2-hydroxyethyl(meth) acrylamide, 2-hydroxypropyl-(meth)acrylamide, and 3-hydroxypropyl(meth)acrylamide. Of these, particularly preferred are hydroxymethyl (meth)acrylate, 2-hydroxyethyl (meth)acrylate, and 3-hydroxypropyl (meth) acrylate. The most highly preferred hydroxy alkyl acrylate monomer is hydroxypropylmethacrylate. These hydroxyl group-containing monomers can be used singly or in combination. For instance, a mixture of 2-hydroxypropylmethacrylate and 3-hydroxypropylmethacrylate can be utilized.

Essentially any type of free radical generator can be used to initiate such free radical emulsion polymerizations. For example, free radical generating chemical compounds, ultraviolet light or radiation can be used. In order to ensure a satisfactory polymerization rate, uniformity and a controllable polymerization, free radical generating chemical agents which are water- or oil-soluble under the polymerization conditions are generally used with good results.

Some representative examples of free radical initiators which are commonly used include the various peroxygen compounds such as potassium persulfate, ammonium persulfate, benzoyl peroxide, hydrogen peroxide, di-t-butyl peroxide, dicumyl peroxide, 2,4-dichlorobenzoyl peroxide, decanoyl peroxide, lauryl peroxide, cumene hydroperoxide, p-menthane hydroperoxide, t-butyl hydroperoxide, acetyl acetone peroxide, dicetyl peroxydicarbonate, t-butyl peroxyacetate, t-butyl peroxymaleic acid, t-butyl peroxybenzoate, acetyl cyclohexyl sulfonyl peroxide, and the like; the various azo compounds such as 2-t-butylazo-2-cyanopropane, dimethyl azodiisobutyrate, azodiisobutyronitrile, 2-t-butylazo-1-cyanocyclohexane, 1-t-amylazo-1-cyanocyclohexane, and the like; the various alkyl perketals, such as 2,2-bis-(t-butylperoxy)butane, ethyl 3,3-bis(t-butylperoxy)butyrate, 1,1-di-(t-butylperoxy) cyclohexane, and the like. Persulfate initiators, such as potassium persulfate and ammonium persulfate, are especially useful in such aqueous emulsion polymerizations.

The amount of initiator employed will vary with the desired molecular weight of the SBR being synthesized. Higher molecular weights are achieved by utilizing smaller quantities of the initiator and lower molecular weights are attained by employing larger quantities of the initiator. However, as a general rule, from 0.005 to 1 phm (parts by weight per 100 parts by weight of monomer) of the initiator will be included in the reaction mixture. In the case of metal persulfate initiators, typically from 0.1 phm to 0.5 phm of the initiator will be employed in the polymerization medium. The molecular weight of the SBR produced is, of course, also dependent upon the amount of chain transfer agent, such as t-dodecyl mercaptan, present during the polymerization. For instance, low molecular weight SBR can be synthesized by simply increasing the level of chain transfer agent. As a specific example, in the synthesis of high molecular weight SBR, the amount of t-dodecyl mercaptan used can be within the range of about 0.125 phm to about 0.150 phm. Low molecular weight SBR can be produced by simply increasing the level of t-dodecyl mercaptan present during the polymerization. For instance, the presence of 0.38 phm to 0.40 phm of t-dodecyl mercaptan will typically result in the synthesis of a low molecular weight SBR.

Unless indicated otherwise, molecular weights are determined by gel permeation chromatography (GPC). A traditional GPC system is used with both light scattering (Wyatt Technologies Inc., model Mini DAWN) and refractive index for detection. Samples are filtered through a 1.0 micron syringe filter. In some cases, number average molecular weights are determined by thermal field flow fractionation. Number average molecular weight that is determined by thermal field flow fractionation is sometimes abbreviated as $M_{n3F}$. In determining $M_{n3F}$, a thermal field flow fractionation system that consists of an FFFractionation, LLC (Salt Lake City, Utah) model T-100 Polymer Fractionator with a model T-005 channel spacer, a Hewlett Packard (Palo Alto, Calif.) model 1047A refractive index detector and a Wyatt Technologies Corporation (Santa Barbara, Calif.) model DAWN DSP laser photometer detector is used. In the test procedure, degassed tetrahydrofuran is used as the carrier solvent which is pumped through the system at a flow rate of 0.6 mL/minute. The cold wall temperature in the thermal field flow fractionation is controlled by an FTS Systems model RC150 recirculating chiller.

Polymer fractionation is accomplished using a Power Programmed Method in FFFractionation, LLC software (TEMP, version 1.30 beta 7). The program conditions are as follows: Initial Delta T is 60° C., equilibration time is 0.5 minutes, t1 is 5.0 minutes, ta is −6.0, hold time is 30 minutes and final Delta T is 0° C. The temperature set point for the cold wall chiller is 25° C. However, at the initial delta T of 60° C., the cold wall temperature is typically around 40° C. Polymer samples are dissolved in a solvent and then injected unfiltered into the thermal field flow fractionation system. The sample mass injected is typically about 0.12 mg.

The raw data is collected and processed in Wyatt Technologies Corporation software (ASTRA, version 4.70.07).

The data collection period is 25 minutes. Baselines for the peaks are typically set from 1.5 minutes to 25 minutes for the light scattering detectors and from 1.5 minutes to 20 minutes for the refractive index detector. For the data processing, the DAWN light scattering detectors used include 5 through 16 (representing angles from 39° to 139° in THF). The angular dependence of the light scattering is fit using a first order equation in the Zimm formalism. A refractive index increment (dn/dc) of 0.154 is used for all emulsion polymer samples and 0.140 is used for solution polymer samples. The sensitivity of the refractive index detector (Aux 1 Constant) is determined according to Wyatt Technologies procedures using a monodisperse 30,000 molecular weight polystyrene standard.

Average molecular weights and root mean square radii for the samples are calculated using slice data fit to a first order polynomial. The light scattering to refractive index ratio (LS/RI) is calculated using the baseline corrected, normalized voltages from the DAWN 90° detector (d11) and the Hewlett Packard model 1047A refractive index detector. The area under each peak was estimated as the sum of the voltages within the defined integration limits.

The high molecular weight SBR will typically have a number average molecular weight (by GPC) which is within the range of about 200,000 to about 1,000,000, a weight average molecular weight (by GPC) which is within the range of about 300,000 to about 2,000,000 and a Mooney ML 1+4 viscosity which is within the range of about 80 to about 160. The high molecular weight SBR will preferably have a number average molecular weight which is within the range of about 300,000 to about 970,000, a weight average molecular weight which is within the range of about 400,000 to about 1,750,000 and a Mooney ML 1+4 viscosity which is within the range of about 90 to about 150. The high molecular weight SBR will more preferably have a number average molecular weight which is within the range of about 650,000 to about 930,000, a weight average molecular weight which is within the range of about 1,000,000 to about 1,500,000 and a Mooney ML 1+4 viscosity which is within the range of about 95 to about 130.

The low molecular weight SBR will typically have a number average molecular weight (by GPC) which is within the range of about 20,000 to about 150,000, a weight average molecular weight (by GPC) which is within the range of about 40,000 to about 280,000 and a Mooney ML 1+4 viscosity which is within the range of about 2 to about 40. The low molecular weight SBR will preferably have a number average molecular weight which is within the range of about 50,000 to about 120,000, a weight average molecular weight which is within the range of about 70,000 to about 270,000 and a Mooney ML 1+4 viscosity which is within the range of about 3 to about 30. The low molecular weight SBR will more preferably have a number average molecular weight which is within the range of about 70,000 to about 110,000, a weight average molecular weight which is within the range of about 120,000 to about 260,000 and a Mooney ML 1+4 viscosity which is within the range of about 5 to about 20. The low molecular weight SBR will usually have a Mooney ML1+4 viscosity which is within the range of 12–18.

The low molecular weight SBR will have a Mooney ML1+4 viscosity that differs from the Mooney ML1+4 viscosity of the high molecular weight SBR by at least 50 Mooney points. The high molecular weight SBR will normally have a Mooney ML1+4 viscosity that is at least 70 Mooney points higher than the Mooney ML 1+4 viscosity of the low molecular weight SBR. The high molecular weight SBR will preferably have a Mooney ML1+4 viscosity that is at least 80 Mooney points higher than the Mooney ML1+4 viscosity of the low molecular weight SBR.

The soap systems used in the emulsion polymerization process contain a combination of rosin acid and fatty acid emulsifiers. The weight ratio of fatty acid soaps to rosin acid soaps will be within the range of about 50:50 to 90:10. It is normally preferred for the weight ratio of fatty acid soaps to rosin acid soaps to be within the range of 60:40 to 85:15. It is normally more preferred for the weight ratio of fatty acid soaps to rosin acid soaps to be within the range of 75:25 to 82:18. All of the soap is charged into the first polymerization zone. The total amount of soap employed will be less than 3.5 phm. The quantity of soap employed will normally be within the range of about 2.5 phm to 3.2 phm. It is typically preferred to utilize a level of soap which is within the range of about 2.6 phm to about 3.0 phm. In most cases, it will be most preferred to use an amount of the soap system which is within the range of about 2.7 phm to 2.9 phm. The precise amount of the soap system required in order to attain optimal results will, of course, vary with the specific soap system being used. However, persons skilled in the art will be able to easily ascertain the specific amount of soap system required in order to attain optimal results.

The free radical emulsion polymerization will typically be conducted at a temperature which is within the range of about 35° F. (2° C.) to about 65° F. (18° C.). It is generally preferred for the polymerization to be carried out at a temperature which is within the range of 40° F. (4° C.) to about 60° F. (16° C.). It is typically more preferred to utilize a polymerization temperature which is within the range of about 45° F. (7° C.) to about 55° F. (13° C.). To increase conversion levels, it can be advantageous to increase the temperature as the polymerization proceeds.

After the desired monomer conversion is reached in the second polymerization zone, the SBR latex made is removed from the second polymerization zone and a short stop is added to terminate the copolymerization. This is a convenient point to blend the emulsion of the high molecular weight SBR with the emulsion of the low molecular weight SBR. The weight ratio of the high molecular weight SBR to the low molecular weight SBR in the blend will typically be within the range of about 80:20 to about 25:75. In most cases, the weight ratio of the high molecular weight SBR to the low molecular weight SBR in the blend will be within the range of about 70:30 to about 30:70. It is typically preferred for the weight ratio of the high molecular weight SBR to the low molecular weight SBR in the blend will be within the range of about 60:40 to about 40:60. The emulsion SBR blend of this invention can then be recovered from the latex by using standard coagulation and drying techniques.

The styrene-butadiene rubber composition of this invention made by blending the two latices will have an $M_{n3F}$ which is within the range of 50,000 to 150,000. The styrene-butadiene rubber composition will typically have an $M_{n3F}$ which is within the range of 60,000 to 145,000 and will more typically have an $M_{n3F}$ which is within the range of 75,000 to 140,000. The styrene-butadiene rubber composition will preferably have an $M_{n3F}$ which is within the range of 90,000 to 135,000. The styrene-butadiene rubber composition will also have a light scattering to refractive index ratio (LS/RI) which is within the range of 1.8 to 3.9. The styrene-butadiene rubber composition will typically have a light scattering to refractive index ratio which is within the range of 2.0 to 3.8 and will more typically have a light scattering to refractive index ratio of 2.1 to 3.7. It is preferred for the styrene-butadiene rubber composition to have a light scattering to refractive index ratio which is within the range of 2.2 to 3.0.

In the styrene-butadiene rubber compositions of this invention if the dynamic oscillation frequency sweep of frequency versus elastic modulus (G') and frequency versus loss modulus (G") are plotted, there is a cross-over at a frequency within the range of 0.001 radians per second to 100 radians per second when conducted at 90° C. to 120° C. using a parallel plate geometry. In other words, at low frequencies at 120° C., such as 0.1 radians per second, G'is lower than G". However, G" increasing with increasing frequency until it equals G" and is ultimately greater than G" at a high frequency, such as 10 radians per second. The cross-over point will typically be within the frequency range of 0.001 radians per second to 10 radians per second and will more typically be within the frequency range of 0.01 radians per second to 5 radians per second. In most cases, the cross-over point will be within the frequency range of 0.05 radians per second to 1 radians per second at 120°. In the test procedure used, the rubber sample is preformed into a sample 20 mm in diameter having a thickness of 2 mm. The sample is then placed in a control stress or control strain rheometer between parallel plates at a given gap distance. The sample is then run through a frequency sweep (such as 0.01 Hz to 100 Hz) at some applied stress (such as 20,000 Pa). This procedure is performed at different temperatures between 90° C. and 120° C. at some defined temperature interval. G' is the storage modulus and represents the elastic portion of the polymer and is very sensitive to changes in gel and molecular weight. G" is the loss modulus and is representative of the viscous portion of the sample.

SBR made by this process can then be employed in manufacturing tires and a wide variety of other rubber articles having improved performance characteristics. There are valuable benefits associated with utilizing the emulsion SBR of this invention in making tire tread compounds. More specifically, traction characteristics can be significantly improved without compromising tread wear or rolling resistance. In many cases, it will be advantageous to blend the emulsion SBR composition of this invention with other rubbery polymers to attain desired characteristics. Such tire tread compounds will, of course, contain other rubbers which are co-curable with the emulsion SBR composition of this invention. Some representative examples of other rubbers which are co-curable with the emulsion SBR of this invention include natural rubber, high cis-1,4-polybutadiene rubber, high vinyl polybutadiene rubber, medium vinyl polybutadiene rubber, high trans-1,4-polybutadiene rubber, solution styrene-butadiene rubber, styrene-isoprene-butadiene rubber, styrene-isoprene rubber, isoprene-butadiene rubber and 3,4-polyisoprene rubber. Blends of the emulsion SBR of this invention with natural rubber or synthetic polyisoprene are highly advantageous for use in tire tread formulations. For instance, 30 phr to 70 phr of the SBR can be blended with 30 phr to 70 phr of natural rubber or synthetic polyisoprene rubber. Blends of 40 phr to 60 phr of the SBR with 40 phr to 60 phr of natural rubber or synthetic polyisoprene rubber are typical. Blends of the SBR with cis-1,4-polybutadiene and/or natural rubber are also useful in tire tread compounds. Such blends will normally contain 30 phr to 70 phr of the SBR and 30 phr to 70 phr of the natural rubber and/or the cis-1,4-polybutadiene rubber. Blends of 40 phr to 60 phr of the SBR with 40 phr to 60 phr of natural rubber and/or cis-1,4-polybutadiene rubber are most typical. The cis-1,4-polybutadiene rubber employed in such blends will typically have a cis-1,4-isomer content of at least about 90 percent and will more typically have a cis-1,4-isomer content of at least about 95 percent. High cis-1,4-polybutadiene rubber which is suitable for use in such blends typically has a cis-isomer content of greater than 90 percent and can be made by the process described in Canadian Patent 1,236,648. High cis-1,4-polybutadiene rubber which is suitable for employment in such blends is also sold by The Goodyear Tire & Rubber Company as Budene® 1207 polybutadiene rubber and Budene® 1208 polybutadiene rubber.

Tire tread compounds having extremely useful characteristics can also be made by including 3,4-polyisoprene in the blend. As a general rule, from about 5 phr (parts per 100 parts of rubber) to about 40 phr of the high Tg 3,4-polyisoprene will be included in tire tread compound with about 60 phr to about 95 phr of the SBR composition of this invention. Normally, such tire tread compounds will contain from about 10 phr to 25 phr of the 3,4-polyisoprene and from about 75 phr to about 90 phr of the SBR composition. It is typically more preferred for such tire tread compounds to contain from about 12 phr to about 20 phr of the high Tg 3,4-polyisoprene rubber. Such tire tread compounds can, of course, also contain other rubbers in addition to the SBR composition. However, it is critical for such rubbers to be co-curable with the SBR composition and the 3,4-polyisoprene. Some representative examples of other rubbers which are co-curable with the SBR composition and the 3,4-polyisoprene rubber include natural rubber, high cis-1,4-polybutadiene rubber, high vinyl polybutadiene rubber, medium vinyl polybutadiene rubber, high trans-1,4-polybutadiene rubber, styrene-isoprene-butadiene rubber, styrene-isoprene rubber, and isoprene-butadiene rubber.

A preferred blend for high performance automobile tires is comprised of, based on 100 parts by weight of rubber, (1) from about 20 to about 60 parts of natural rubber, (2) from about 5 to about 30 parts of high cis-1,4-polybutadiene rubber, (3) from about 10 to about 50 parts of SBR composition and (4) from about 5 to about 30 parts of 3,4-polyisoprene rubber. It is preferred for such a blend to contain (1) from about 30 to about 50 parts of natural rubber, (2) from about 10 to about 20 parts of high cis-1,4-polybutadiene rubber, (3) from about 20 to about 40 parts of the SBR composition, and (4) from about 10 to about 20 parts of the 3,4-polyisoprene rubber. It is more preferred for such a tire tread rubber formulation to contain (1) from about 35 to about 45 parts of natural rubber, (2) from about 10 to about 20 parts of high cis-1,4-polybutadiene rubber, (3) from about 25 to about 35 parts of the SBR composition and (4) from about 10 to about 20 parts of the 3,4-polyisoprene rubber.

In order to maximize tire performance characteristics, a combination of high Tg 3,4-polyisoprene, low Tg 3,4-polyisoprene, and the SBR composition of this invention can be employed in the tire tread compound. The low Tg 3,4-polyisoprene will have a Tg of less than about −5° C. The low Tg 3,4-polyisoprene will typically have a Tg which is within the range of about −55° C. to about −5° C. It is preferred for the low Tg 3,4-polyisoprene to have a Tg which is within the range of about −30° C. to about −10° C. and it is most preferred for the low Tg 3,4-polyisoprene to have a Tg which is within the range of about −20° C. to about −10° C. The low Tg 3,4-polyisoprene will also typically have a number average molecular weight of greater than about 200,000. The low Tg 3,4 -polyisoprene will generally have a number average molecular weight which is within the range of about 200,000 to about 500,000 and will preferably have a number average molecular weight which is within the range of about 250,000 to about 400,000. The high Tg 3,4-polyisoprene will typically have a Tg which is within the range of 0° C. to about 25° C. and a number average molecular weight which is within the range of about 30,000 to about 180,000. The high Tg 3,4-polyisoprene will preferably have a Tg which is within the range of about 5° C. to about 20° C. The high Tg 3,4-polyisoprene will also typically have a 3,4-isomer content which is within the range of about 75 percent to about 95 percent and a 1,2-isomer content which is within the range of about 5 percent to about 25 percent.

In such tire tread compounds the weight ratio of high Tg 3,4-polyisoprene to low Tg 3,4-polyisoprene will typically be within the range of about 0.1:1 to about 10:1. It is normally preferred for the weight ratio of high Tg 3,4-polyisoprene to low Tg 3,4-polyisoprene to be within the range of about 0.5:1 to about 2:1. It is generally most preferred for the weight ratio of high Tg 3,4-polyisoprene to low Tg 3,4-polyisoprene to be within the range of about 0.8:1 to about 1.2:1. The high Tg 3,4-polyisoprene and low Tg 3,4-polyisoprene will normally be used in essentially equal amounts to attain optimal results.

A highly preferred blend for high performance automobile tires is comprised of, based on 100 parts by weight of rubber, (1) from about 20 to about 60 parts of natural rubber, (2) from about 5 to about 30 parts of high cis-1,4-polybutadiene rubber, (3) from about 10 to about 50 parts of the SBR composition of this invention, (4) from about 2.5 to about 15 parts of the high Tg 3,4-polyisoprene rubber and (5) from about 2.5 to about 15 parts of a low Tg 3,4-polyisoprene rubber. It is preferred for this blend to contain (1) from about 30 to about 50 parts of natural rubber, (2) from about 10 to about 20 parts of high cis-1,4-polybutadiene rubber, (3) from about 20 to about 40 parts of the SBR composition, (4) from about 5 to about 10 parts of the high Tg 3,4-polyisoprene rubber and (5) from about 5 to about 10 parts of a low Tg 3,4-polyisoprene rubber. It is more preferred for this tire tread rubber formulation to contain (1) from about 35 to about 45 parts of natural rubber, (2) from about 10 to about 20 parts of high cis-1,4-polybutadiene rubber, (3) from about 25 to about 35 parts of the SBR composition, (4) from about 5 to about 10 parts of the high Tg 3,4-polyisoprene rubber and (5) from about 5 to about 10 parts of a low Tg 3,4-polyisoprene rubber.

In cases where it is desirable to maximize tire traction characteristics, the high cis-1,4-polybutadiene rubber can be eliminated from the blend. However, it should be appreciated that in such cases tread wear characteristics may be compromised to some degree. In any case, outstanding tire tread compounds for high performance tires can be made by blending, based on 100 parts by weight of rubber, (1) from about 20 to about 60 parts of natural rubber, (2) from about 10 to about 50 parts of the SBR composition, and (3) from about 10 to about 30 parts of the high Tg 3,4-polyisoprene rubber. In another scenario, the blend could be comprised of, based on 100 parts by weight of rubber, (1) from about 20 to about 60 parts of natural rubber, (2) from about 10 to about 50 parts of the SBR composition, (3) from about 5 to about 15 parts of the high Tg 3,4-polyisoprene rubber and (4) from about 5 to about 15 parts of a low Tg 3,4-polyisoprene.

The emulsion SBR containing rubber blends of this invention can be compounded utilizing conventional ingredients and standard techniques. For instance, such rubber blends will typically be mixed with carbon black and/or silica, sulfur, fillers, accelerators, oils, waxes, scorch inhibiting agents and processing aids. In most cases, the emulsion SBR blend will be compounded with sulfur and/or a sulfur-containing compound, at least one filler, at least one accelerator, at least one antidegradant, at least one processing oil, zinc oxide, optionally a tackifier resin, optionally a reinforcing resin, optionally one or more fatty acids, optionally a peptizer and optionally one or more scorch inhibiting agents. Such blends will normally contain from about 0.5 to 5 phr (parts per hundred parts of rubber by weight) of sulfur and/or a sulfur-containing compound with 1 phr to 2.5 phr being preferred. It may be desirable to utilize insoluble sulfur in cases where bloom is a problem.

Normally from 10 to 150 phr of at least one filler will be utilized in the blend with 30 to 80 phr being preferred. In most cases, at least some carbon black will be utilized in the filler. The filler can, of course, be comprised totally of carbon black. Silica can be included in the filler to improve tear resistance and heat buildup. Clays and/or talc can be included in the filler to reduce cost. The blend will also normally include from 0.1 to 2.5 phr of at least one accelerator with 0.2 to 1.5 phr being preferred. Antidegradants, such as antioxidants and antiozonants, will generally be included in the tread compound blend in amounts ranging from 0.25 to 10 phr with amounts in the range of 1 to 5 phr being preferred. Processing oils will generally be included in the blend in amounts ranging from 2 to 100 phr with amounts ranging from 5 to 50 phr being preferred. The emulsion SBR rubber blends of this invention will also normally contain from 0.5 to 10 phr of zinc oxide with 1 to 5 phr being preferred. These blends can optionally contain from 0 to 10 phr of tackifier resins, 0 to 10 phr of reinforcing resins, 1 to 10 phr of fatty acids, 0 to 2.5 phr of peptizers and 0 to 2 phr of scorch inhibiting agents.

In many cases, it will be advantageous to include silica in the tread rubber formulation of this invention. The processing of the emulsion SBR containing blend is normally conducted in the presence of a sulfur containing organosilicon compound (silica coupler) to realize maximum benefits. Examples of suitable sulfur-containing organosilicon compounds are of the formula:

Z-Alk-S$_n$-Alk-Z (I)

in which Z is selected from the group consisting of

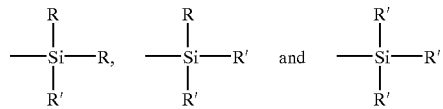

where R is an alkyl group of 1 to 4 carbon atoms, cyclohexyl or phenyl; wherein R' is an alkoxy group containing 1 to 8 carbon atoms or a cycloalkoxy group containing 5 to 8 carbon atoms; and wherein Alk is a divalent hydrocarbon of 1 to 18 carbon atoms and n is an integer of 2 to 8.

Specific examples of sulfur-containing organosilicon compounds which may be used in accordance with the present invention include: 3,3'-bis(trimethoxysilylpropyl) disulfide, 3,3'-bis(triethoxysilylpropyl) tetrasulfide, 3,3'-bis(triethoxysilylpropyl) octasulfide, 3,3'-bis(trimethoxysilylpropyl) tetrasulfide, 2,2'-bis(triethoxysilylethyl) tetrasulfide, 3,3'-bis(trimethoxysilylpropyl) trisulfide, 3,3'-bis(triethoxysilylpropyl) trisulfide, 3,3'-bis(tributoxysilylpropyl) disulfide, 3,3'-bis(trimethoxysilylpropyl) hexasulfide, 3,3'-bis(trimethoxysilylpropyl) octasulfide, 3,3'-bis(trioctoxysilylpropyl) tetrasulfide, 3,3'-bis (trihexoxysilylpropyl) disulfide, 3,3'-bis(tri-2"-ethylhexoxysilylpropyl) trisulfide, 3,3'-bis(triisooctoxysilylpropyl) tetrasulfide, 3,3'-bis(tri-t-butoxysilylpropyl) disulfide, 2,2'-bis(methoxy diethoxy silyl ethyl) tetrasulfide, 2,2'-bis(tripropoxysilylethyl) pentasulfide, 3,3'-bis(tricyclonexoxysilylpropyl) tetrasulfide, 3,3'-bis(tricyclopentoxysilylpropyl) trisulfide, 2,2'-bis(tri-2"-methylcyclohexoxysilylethyl) tetrasulfide, bis(trimethoxysilylmethyl) tetrasulfide, 3-methoxy ethoxy propoxysilyl 3'-diethoxybutoxy-silylpropyltetrasulfide, 2,2'-bis(dimethyl methoxysilylethyl) disulfide, 2,2'-bis(dimethyl sec.butoxysilylethyl) trisulfide, 3,3'-bis(methyl butylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl) trisulfide, 2,2'-bis(methyl ethoxypropoxysilylethyl) tetrasulfide, 3,3'-bis(diethyl methoxysilylpropyl) tetrasulfide, 3,3'-bis(ethyl di-sec.butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis(trimethoxysilylbutyl) tetrasulfide, 6,6'-bis(triethoxysilylhexyl) tetrasulfide, 12,12'-bis(triisopropoxysilyl dodecyl) disulfide, 18,18'-bis(trimethoxysilyloctadecyl) tetrasulfide, 18,18'-bis(tripropoxysilyloctadecenyl) tetrasulfide, 4,4'-bis(trimethoxysilyl-buten-2-yl) tetrasulfide, 4,4'-bis(trimethoxysilylcyclohexylene) tetrasulfide, 5,5'-bis(dimethoxymethylsilylpentyl) trisulfide, 3,3'-bis(trimethoxysilyl-2-methylpropyl) tetrasulfide, 3,3'-bis(dimethoxyphenylsilyl-2-methylpropyl) disulfide.

The preferred sulfur-containing organosilicon compounds are the 3,3'-bis(trimethoxy or triethoxy silylpropyl) sulfides. The most preferred compound is 3,3'-bis(triethoxysilylpropyl) tetrasulfide. Therefore, as to Formula I, preferably Z is

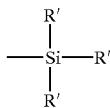

where R' is an alkoxy of 2 to 4 carbon atoms, with 2 carbon atoms being particularly preferred; Alk is a divalent hydrocarbon of 2 to 4 carbon atoms with 3 carbon atoms being particularly preferred; and n is an integer of from 3 to 5 with 4 being particularly preferred.

The amount of the sulfur-containing organosilicon compound of Formula I in a rubber composition will vary, depending on the level of silica that is used. Generally speaking, the amount of the compound of Formula I will range from about 0.01 to about 1.0 parts by weight per part by weight of the silica. Preferably, the amount will range from about 0.02 to about 0.4 parts by weight per part by weight of the silica. More preferably, the amount of the compound of Formula I will range from about 0.05 to about 0.25 parts by weight per part by weight of the silica.

In addition to the sulfur-containing organosilicon, the rubber composition should contain a sufficient amount of silica, and carbon black, if used, to contribute a reasonably high modulus and high resistance to tear. The silica filler may be added in amounts ranging from about 10 phr to about 250 phr. Preferably, the silica is present in an amount ranging from about 15 phr to about 80 phr. If carbon black is also present, the amount of carbon black, if used, may vary. Generally speaking, the amount of carbon black will vary from about 5 phr to about 80 phr. Preferably, the amount of carbon black will range from about 10 phr to about 40 phr. It is to be appreciated that the silica coupler may be used in conjunction with a carbon black; namely, pre-mixed with a carbon black prior to addition to the rubber composition and such carbon black is to be included in the aforesaid amount of carbon black for the rubber composition formulation. In any case, the total quantity of silica and carbon black will be at least about 30 phr. The combined weight of the silica and carbon black, as hereinbefore referenced, may be as low as about 30 phr, but is preferably from about 45 to about 130 phr.

The commonly employed siliceous pigments used in rubber compounding applications can be used as the silica in this invention, including pyrogenic and precipitated siliceous pigments (silica), although precipitate silicas are preferred. The siliceous pigments preferably employed in this invention are precipitated silicas such as, for example, those obtained by the acidification of a soluble silicate; e.g., sodium silicate.

Such silicas might be characterized, for example, by having a BET surface area, as measured using nitrogen gas, preferably in the range of about 40 to about 600, and more usually in a range of about 50 to about 300 square meters per gram. The BET method of measuring surface area is described in the Journal of the American Chemical Society, Volume 60, page 304 (1930).

The silica may also be typically characterized by having a dibutylphthalate (DBP) absorption value in a range of about 100 to about 400, and more usually about 150 to about 300. The silica might be expected to have an average ultimate particle size, for example, in the range of 0.01 to 0.05 micron as determined by the electron microscope, although the silica particles may be even smaller, or possibly larger, in size.

Various commercially available silicas may be considered for use in this invention such as, only for example herein, and without limitation, silicas commercially available from PPG Industries under the Hi-Sil trademark with designations 210, 243, etc; silicas available from Rhone-Poulenc, with, for example, designations of Z1165MP and Z165GR and silicas available from Degussa AG with, for example, designations VN2 and VN3.

Tire tread formulations which include silica and an organosilicon compound will typically be mixed utilizing a thermomechanical mixing technique. The mixing of the tire tread rubber formulation can be accomplished by methods known to those having skill in the rubber mixing art. For example, the ingredients are typically mixed in at least two stages; namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The rubber, silica and sulfur-containing organosilicon, and carbon black if used, are mixed in one or more non-productive mix stages. The terms "non-productive" and "productive" mix stages are well known to those having skill in the rubber mixing art. The sulfur-vulcanizable rubber composition containing the sulfur-containing organosilicon compound, vulcanizable rubber and generally at least part of the silica should be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be for a duration of time which is within the range of about 2 minutes to about 20 minutes. It will normally be preferred for the rubber to reach a temperature which is within the range of about 145° C. to about 180° C. and to be maintained at said temperature for a period of time which is within the range of about 4 minutes to about 12 minutes. It will normally be more preferred for the rubber to reach a temperature which is within the range of about 155° C. to about 170° C. and to be maintained at said temperature for a period of time which is within the range of about 5 minutes to about 10 minutes.

The emulsion SBR containing tire tread compounds of this invention can be used in tire treads in conjunction with ordinary tire manufacturing techniques. Tires are built utilizing standard procedures with the emulsion SBR of this invention being substituted for the rubber compounds typically used as the tread rubber. After the tire has been built with the emulsion SBR containing blend, it can be vulcanized using a normal tire cure cycle. Tires made in accordance with this invention can be cured over a wide temperature range. However, it is generally preferred for the tires of this invention to be cured at a temperature ranging from about 132° C. (270° F.) to about 166° C. (330° F.). It is more typical for the tires of this invention to be cured at a temperature ranging from about 143° C. (290° F.) to about 154° C. (310° F.). It is generally preferred for the cure cycle used to vulcanize the tires of this invention to have a duration of about 10 to about 20 minutes with a cure cycle of about 12 to about 18 minutes being most preferred.

This invention is illustrated by the following examples which are merely for the purpose of illustration and are not to be regarded as limiting the scope of the invention or the manner in which it can be practiced. Unless specifically indicated otherwise, all parts and percentages are given by weight.

EXAMPLE 1

(Control)

In this experiment, a SBR latex was synthesized by copolymerizing 1,3-butadiene monomer and styrene monomer by a standard continuous process. This procedure was conducted in a pilot plant which consisted of a series of five polymerization reactors. All of the reactors used in this procedure were 30-gallon stirred reactors which were connected to operate in series (the reactor chain had a total chain volume of 150 gallons). The reactor chain was continuously operated at an actual running rate of 18.53 gallons per hour which provided an actual reaction time of 8.1 hours.

The monomers were fed into the first reactor at a rate of 48.9 pounds per hour. The monomer charge employed contained 69 weight percent 1,3-butadiene and 31 weight percent styrene. An activator solution, a soap solution, a scavenger solution, a modifier and an initiator were also continuously changed into the first reactor.

The activator solution was an aqueous solution containing 0.67 percent sodium ferric ethylenediaminetetraacetate. It was charged into the first reactor at a rate which was sufficient to maintain a 0.026 phm level of sodium ferric ethylenediaminetetraacetate.

The soap solution contained 96.79 percent water, 0.19 percent sodium hydroxide, 0.20 percent potassium hydroxide, 0.59 percent of the potassium soap of disproportionated wood rosin, 1.10 percent hydrogenated mixed tallow fatty acids, 0.89 percent of the potassium soap of disproportionated tall oil rosin, 0.18 percent of the sodium salt of a condensed naphthalene sulfonic acid, 0.03 percent tetrapotassium pyrophosphate, 0.02 percent sodium formaldehyde sulfoxylate and 0.01 percent sodium hydrosulfite. The soap system solution was charged into the first reactor at a rate which was sufficient to maintain a 0.341 phm level of sodium hydroxide, a 0.374 phm level of potassium hydroxide, a 1.088 phm level of the potassium soap of disproportionated wood rosin, a 2.022 phm level of hydrogenated mixed tallow fatty acids, a 1.631 phm level of the potassium soap of disproportionated tall oil rosin, a 0.335 phm level of the sodium salt of a condensed naphthalene sulfonic acid, a 0.057 phm level of tetrapotassium pyrophosphate, a 0.034 phm level of sodium formaldehyde sulfoxylate and a 0.019 phm level of sodium hydrosulfite.

The scavenger solution contained 99.31 percent water, 0.096 percent sodium hydroxide and 0.60 percent sodium hydrosulfite. The scavenger solution was charged into the first reactor at a rate which was sufficient to maintain a 0.004 phm level of sodium hydroxide and a 0.026 phm level of sodium hydrosulfite (the total level of sodium hydrosulfite was 0.045 phm).

The modifier charged into the first reactor was t-dodecyl mercaptan. It was charged into the reactor at a rate of 0.137 phm. The initiator charged into the first reactor was pinane hydroperoxide and it was charged at a rate of 0.087 phm.

In this procedure, the polymerization was terminated by adding a mixture of diethylhydroxylamine and sodium dimethyldithiocarbamate to the latex as a shortstop after it exited the fifth reactor. The latex made by this procedure was stable. However, stable latices could not be made if the level of soap added to the first reactor was reduced.

EXAMPLE 2

In this experiment, a high molecular weight emulsion SBR was made by the FIM process. In the procedure used, the equipment and procedure described in Example 1 were repeated except that the monomer charge was split with some of the monomer being charged into the third reactor. In this procedure, 29.6 pounds per hour of monomer were continuously charged into the first reactor and 19.1 pounds per hour of monomer were continuously charged into the third reactor. This allowed for the total level of soap to be reduced by about 40 percent.

In this experiment, the soap solution charged into the first reactor contained 98.0 percent water, 0.25 percent potassium hydroxide, 0.13 percent potassium chloride, 0.0 percent of the potassium soap of disproportionated wood rosin, 1.18 percent hydrogenated mixed tallow fatty acids, 0.28 percent of the potassium soap of disproportionated tall oil rosin, 0.12 percent of the sodium salt of a condensed naphthalene sulfonic acid, 0.02 percent tetrapotassium pyrophosphate, 0.02 percent sodium formaldehyde sulfoxylate and 0.01 percent sodium hydrosulfite. The soap system solution was charged into the first reactor at a rate which was sufficient to maintain a 0.435 phm level of potassium hydroxide, a 0.230 phm level of potassium chloride, a 0.0 phm level of the potassium soap of disproportionated wood rosin, a 2.076 phm level of hydrogenated mixed tallow fatty acids, a 0.492 phm level of the potassium soap of disproportionated tall oil rosin, a 0.206 phm level of the sodium salt of a condensed naphthalene sulfonic acid, a 0.035 phm level of tetrapotassium pyrophosphate, a 0.035 phm level of sodium formaldehyde sulfoxylate and a 0.019 phm level of sodium hydrosulfite.

In this procedure, 0.503 phm of an aqueous solution of Witconate® 1223L, the sodium salt of a linear alkylbenzene sulfonic acid (from Witco Chemicals), was also charged into the first reactor as a secondary surfactant. The level of pinane hydroperoxide initiator was also increased to 0.110 phm.

The SBR latex made utilizing this procedure proved to be stable. The utilization of this technique results in the production of an emulsion SBR having a number average molecular weight of about 130,000 and a weight average molecular weight of about 490,000. The level of residual soap in the SBR recovered from the latex was also reduced.

EXAMPLE 3

A low molecular weight emulsion SBR can be made by utilizing the technique described in Example 2 by simply increasing the level of t-dodecyl mercaptan to 0.39 phm. In this case, the number average molecular weight of the emulsion SBR produced will be about 60,000 and its weight average molecular weight will be about 185,000.

EXAMPLES 4–6

In this experiment, a blend of a high molecular weight emulsion SBR made by the FIM process and a low molecular weight emulsion SBR made by the FIM process was made and compounded into a standard tire tread rubber. This rubber was cured and its physical properties were compared to similar rubber compounds made with standard emulsion SBR and standard solution SBR. The high molecular weight SBR in the blend contained 23.5 percent bound styrene and had a number average molecular weight of 130,000, a weight average molecular weight of 490,000 and a glass transition temperature of about −55° C. The low molecular weight SBR in the blend contained 5 percent bound styrene and had a number average molecular weight of 67,000, a weight average molecular weight of 251,000 and a Mooney ML 1+4 viscosity of 20.7. The weight ratio of high molecular weight SBR to low molecular weight SBR in the blend was 50:50.

The rubber compounds were made by mixing 70 parts of the three different SBR rubbers with 37.5 parts of high cis-1,4-polybutadiene rubber, 70 parts of carbon black, 2 parts of zinc oxide, 0.8 parts of a paraffin wax, 3 parts of a microcrystalline wax, 1.15 parts of Wingstay® 100 para-phenylene diamine antioxidant, 1.2 parts of N-cyclohexyl-2-benzothiazole sulfenamide, 0.3 parts of tetramethyl thiuram disulfide and 1.45 parts of sulfur. The rubber formulations were then cured and evaluated to determine physical properties. The tan delta of the cured rubber blends at 0° C. and 60° C. is reported in Table I. Tan delta is measured using a dynamic mechanical tester in tensile mode at 11 Hz and at a strain range from 0.01 percent to 15 percent.

TABLE I

| Example | Tan Delta @ 0° C. | Tan Delta @ 60° C. |
|---|---|---|
| 4 - New Emulsion SBR Blend | 0.15 | 0.10 |
| 5 - Standard Solution SBR | 0.12 | 0.10 |
| 6 - Standard Emulsion SBR | 0.16 | 0.13 |

Low tan delta values at 60° C. are indicative of low hysteresis and consequently tire treads made with such rubbers exhibit lower rolling resistance than tires made with rubbers having higher tan delta values at 60° C. On the other hand, rubbers which have high tan delta values at 0° C. can be utilized in making tire treads which exhibit better traction characteristics than tires made with tread rubber compositions which have lower tan delta values at 0° C. It is normally preferred for a tread rubber composition to have the highest possible tan delta value at 0° C. to realize the best possible traction characteristics over all driving conditions and at all driving speeds. It is also preferred for the tread rubber composition to have the lowest possible tan delta value at 60° C. to provide low rolling resistance and good treadwear characteristics.

The use of the emulsion SBR blend of this invention in the compounded rubber resulted in a high tan delta value at 0° C. and a low tan delta value at 60° C. This is indicative of good traction characteristics, rolling resistance and treadwear. In fact, the cured rubber blend made with the emulsion rubber of this invention had a tan delta value at 0° C. which was almost as high as the cured rubber sample made with the conventional emulsion SBR. Remarkably, the cured rubber blend made with the emulsion rubber of this invention also had a tan delta value at 60° C. which was virtually the same as the cured rubber sample made with the standard solution SBR. Thus, by utilizing the technique of this invention, an emulsion SBR can be made that has the best characteristics of both solution SBR and emulsion SBR.

The styrene-butadiene rubber of this invention will normally have a tan delta at 0° C. which is within the range of 0.13 to 0.19 and a tan delta at 60° C. which is within the range of 0.06 to 0.120 after being cured in a rubber blend containing 70 parts by weight of the styrene-butadiene rubber, 30 parts by weight of high cis-1,4-polybutadiene rubber, 7.5 parts by weight of highly aromatic processing oil, 70 parts by weight of N220 carbon black, 2 parts by weight of zinc oxide, 0.8 parts by weight of a paraffin wax, 3 parts by weight of a microcrystalline wax, 1.15 parts by weight of para-phenylene diamine antioxidant, 1.2 parts by weight of N-cyclohexyl-2-benzothiazole sulfenamide, 0.3 parts by weight of tetramethyl thiuram disulfide and 1.45 parts by weight of sulfur. In most cases the styrene-butadiene rubber compositions of this invention will have a tan delta at 0° C. which is within the range of 0.14 to 0.18 and a tan delta at 60° C. which is within the range of 0.08 to 0.11 after being cured in such a rubber blend. It is generally preferred for the styrene-butadiene rubber compositions of this invention will have a tan delta at 0° C. which is within the range of 0.15 to 0.17 and a tan delta at 60° C. which is within the range of 0.09 to 0.10 after being cured in such a rubber blend.

EXAMPLES 7–9

In this experiment, a blend of a high molecular weight emulsion SBR made by the FIM process and a low molecular weight emulsion SBR made by the FIM process was made and compounded into a standard tire tread rubber. This rubber was cured and its physical properties were compared to similar rubber compounds made with standard emulsion SBR and standard solution SBR. The high molecular weight SBR in the blend contained 23.5 percent bound styrene and had a number average molecular weight of 130,000, a weight average molecular weight of 490,000 and a glass transition temperature of about −55° C. The low molecular weight SBR in the blend contained 48 percent bound styrene and had a number average molecular weight of 56,000, a weight average molecular weight of 137,000 and a Mooney ML 1+4 viscosity of 11.4. The weight ratio of high molecular weight SBR to low molecular weight SBR in the blend was 50:50.

The rubber compounds were made by mixing 70 parts of the three different SBR rubbers with 37.5 parts of high cis-1,4-polybutadiene rubber, 70 parts of carbon black, 2 parts of zinc oxide, 0.8 parts of a paraffin wax, 3 parts of a microcrystalline wax, 1.15 parts of Wingstay® 100 antioxidant, 1.2 parts of N-cyclohexyl-2-benzothiazole sulfenamide, 0.3 parts of tetramethyl thiuram disulfide and 1.45 parts of sulfur. The rubber formulations were then cured and evaluated to determine physical properties. The tan delta of the cured rubber blends at 0° C. and 60° C. is reported in Table II.

TABLE II

| Example | Tan Delta @ 0° C. | Tan Delta @ 60° C. |
|---|---|---|
| 7 - New Emulsion SBR Blend | 0.25 | 0.12 |
| 8 - Standard Solution SBR | 0.13 | 0.11 |
| 9 - Standard Emulsion SBR | 0.12 | 0.12 |

As has been previously explained, low tan delta values at 60° C are indicative of low hysteresis and consequently tire treads made with such rubbers exhibit lower rolling resistance than tires made with rubbers having higher tan delta values at 60° C. On the other hand, rubbers which have high tan delta values at 0° C. can be utilized in making tire treads which exhibit better traction characteristics than tires made with tread rubber compositions which have lower tan delta values at 0° C. It is normally preferred for a tread rubber composition to have the highest possible tan delta value at 0° C. to realize the best possible traction characteristics over all driving conditions and at all driving speeds. It is also preferred for the tread rubber composition to have the lowest possible tan delta value at 60° C. to provide low rolling resistance and good treadwear characteristics.

The use of the emulsion SBR blend of this invention in the compounded rubber resulted in a relatively high tan delta value at 0° C. and an low tan delta value at 60° C. This is indicative of outstanding traction characteristics and good rolling resistance and treadwear. The cured rubber blend made with the emulsion rubber of this invention had a tan delta value at 0° C. which was higher than that of the cured rubber sample made with the conventional solution SBR. Remarkably, the cured rubber blend made with the emulsion rubber of this invention also had a tan delta value at 60° C. which was similar to that of the cured rubber sample made with the standard solution rubber. Thus, the emulsion SBR of this invention can be used in making tire treads that exhibit better traction characteristics and surprisingly equivalent rolling resistance and treadwear characteristics than tire treads made with solution SBR.

The styrene-butadiene rubber of this invention will normally have a tan delta at 0° C. which is within the range of 0.18 to 0.40 and a tan delta at 60° C. which is within the range of 0.09 to 0.16 after being cured in a rubber blend containing 70 parts by weight of the styrene-butadiene rubber, 30 parts by weight of high cis-1,4-polybutadiene rubber, 7.5 parts by weight of highly aromatic processing oil, 70 parts by weight of N220 carbon black, 2 parts by weight of zinc oxide, 0.8 parts by weight of a paraffin wax, 3 parts by weight of a microcrystalline wax, 1.15 parts by weight of para-phenylene diamine antioxidant, 1.2 parts by weight of N-cyclohexyl-2-benzothiazole sulfenamide, 0.3 parts by weight of tetramethyl thiuram disulfide and 1.45 parts by weight of sulfur. In most cases the styrene-butadiene rubber compositions of this invention will have a tan delta at 0° C. which is within the range of 0.20 to 0.30 and a tan delta at 60° C. which is within the range of 0.10 to 0.14 after being cured in such a rubber blend. It is generally preferred for the styrene-butadiene rubber compositions of this invention will have a tan delta at 0° C. which is within the range of 0.23 to 0.27 and a tan delta at 60° C. which is within the range of 0.10 to 0.13 after being cured in such a rubber blend.

EXAMPLE 10

In this experiment, two styrene-butadiene (SBR) latices were synthesized by emulsion copolymerization of 1,3-butadiene monomer and styrene monomer in a continuous process. After polymerization, the latices were blended in a specific ratio and then coagulated and dried. This experiment was conducted at Goodyear's Houston production facility.

A latex having a high Mooney ML1+4 viscosity and medium bound styrene content was synthesized in a series of 13 continuous stirred-tank reactors (CSTRs). A styrene stream, a 1,3-butadiene stream and a modifier stream were mixed and fed into a Ligtnin static mixer having a diameter of about 3 inches (7.6 cm) and a length of about 30 inches (76 cm) prior to being split and fed into polymerization reactors. About 60 percent of this monomer/modifier stream was mixed with soft water and cooled in a heat exchanger to a temperature of about 52° F. (11° C.). An activator solution, soap solution, oxygen scavenger solution and initiator were added to the stream after it had exited the heat exchanger but before it entered into a second Ligtnin static mixed having a length of about 36 inches (91 cm) and a diameter of about 4 inches (10.2 cm). After this static mixer, the combined stream had a residence time of about 40 seconds in the tubular reactor before entering the first CSTR. The remaining 40 percent of the monomer/modifier stream was fed continuously into the fifth reactor in the chain. The reactor chain configuration is described in the following table:

| | | | | Agitration | |
|---|---|---|---|---|---|
| RV | Type | Vol (gal) | Pzm Temp (deg F.) | Impeller Type | Speed (rpm) |
| 0 | Tubular | 100 | 63 | | |
| 1 | CSTR | 5700 | 50 | Brumagin | 71 |
| 2 | CSTR | 5700 | 50 | Brumagin | 71 |
| 3 | CSTR | 5700 | 50 | Brumagin | 71 |
| 4 | CSTR | 5700 | 50 | Brumagin | 71 |
| 5 | CSTR | 5700 | 50 | Brumagin | 71 |
| 6 | CSTR | 5700 | 50 | Brumagin | 71 |
| 7 | CSTR | 5700 | 50 | Brumagin | 71 |
| 8 | CSTR | 5700 | 50 | Brumagin | 71 |
| 9 | CSTR | 5700 | 50 | Axial Flow Turbine | 71 |
| 10 | CSTR | 5700 | 50 | Axial Flow Turbine | 71 |
| 11 | CSTR | 5700 | 50 | Axial Flow Turbine | 71 |
| 12 | CSTR | 5700 | 50 | Axial Flow Turbine | 71 |
| 13 | CSTR | 5700 | 50 | Axial Flow Turbine | 71 |

The following streams were charged to this reactor configuration continuously:

| | Mass Flow Rate (lbs/min) | Steam Composition (%) |
|---|---|---|
| First Stage: Streams added to tubular reactor | | |
| Butadiene Monomer: | 209.65 | |
| 1,3-butadiene | | 90.00 |
| impurities (mixed butenes, isobutylene, 4-vinylcyclohexene, et al) | | 10.00 |
| Styrene Monomer: | 85.93 | |
| Styrene | | 91.00 |

-continued

| | Mass Flow Rate (lbs/min) | Steam Composition (%) |
|---|---|---|
| Impurities (4-vinylcyclohexene, ethylbenzene, mixed xylenes, et al) | | 9.00 |
| Soap Solution: | 124.25 | |
| soft water | | 79.33 |
| 45% aqueous solution of potassium hydroxide | | 2.04 |
| 40% aqueous solution of tripotassium phosphate | | 2.06 |
| 20% aqueous solution of sodium hydroxide | | 1.71 |
| mixed hydrogenated tallow fatty acid | | 8.21 |
| 47% aqueous solution of sodium napthelene sulfonate | | 1.70 |
| potassium soap of disproportionated tall oil rosin (80% active) | | 1.95 |
| 23% aqueous solution of sodium dodecyl-benzene sulfonate | | 3.00 |
| Soft Water | 702.64 | 100.00 |
| Initiator: | 0.68 | |
| pinane hydroperoxide (44% active) | | 100.00 |
| Activator Solution: | 65.59 | |
| soft water | | 98.69 |
| 20% aqueous solution of ferrous sulfate | | 0.41 |
| 40% aqueous solution of tetrasodium ethylene-diaminetetraacetate | | 0.56 |
| sodium formaldehyde sulfoxylate | | 0.34 |
| Modifier (Chain Transfer Agent): | 0.29 | |
| tertiary dodecylmercaptan | | 100.00 |
| Oxygen Scavenger Solution: | 2.46 | |
| soft water | | 97.00 |
| sodium hydrosulfite | | 3.00 |
| Second Stage: Streams added to fifth CSTR | | |
| Butadiene Monomer: | 139.76 | |
| 1,3-butadiene | | 90.00 |
| impurities (mixed butenes, isobutylene, 4-vinylcyclohexene, et al) | | 10.00 |
| Styrene Monomer: | 57.28 | |
| styrene | | 91.00 |
| impurities (4-vinylcyclohexene, ethylbenzene, mixed xylenes, et al) | | 9.00 |
| Modifier (Chain Transfer Agent): | 0.20 | |
| tertiary dodecylmercaptan | | 100.00 |
| Shortstop: Added after 13th CSTR at 62% conversion (or 22.6% solids) | 42.56 | |
| soft water | | 97.08 |
| 85% aqueous solution of diethylhydroxylamine | | 0.38 |
| 40% aqueous solution of sodium dimethyl-dithiocarbamate | | 0.80 |
| 47% aqueous solution of sodium napthelene sulfonate | | 0.89 |
| 45% aqueous solution of potassium hydroxide | | 0.85 |
| Defoamer: Added to latex during monomer recovery operations | 0.30 | |
| soft water | | 50.00 |
| Nalco-Exxon FC9060A defoamer | | 50.00 |

The latex made was continuously removed from the thirteenth reactor and passed through a filter to remove coagulum. The filter consisted of a basket strainer having holes with a diameter of about ⅜-inch (9.5 mm). The latex was then passed through blow-down tanks for recovery of residual 1,3-butadiene monomer. The defoamer identified in the table above was added to the stream after it exited the blow-down tanks. The latex stream was then passed through a first flash tank with a vacuum of about 3–5 psig ($1.2 \times 10^5$ Pa to $1.4 \times 10^5$ Pa) being applied. It was subsequently passed through a second flash tank with a vacuum of about 22 inches of mercury ($7.4 \times 10^4$ Pa) being applied. The latex then went through a 12-tray steam-stripping column with about 15 psig of steam being injected into the bottom of the column and a vacuum of about 22 inches of mercury ($7.4 \times 10^4$ Pa) being applied to the top of the column. After unreacted monomers were removed from this stable latex by steam-stripping, it was found to have a solids content of 20.8 percent, a 23.4 percent bound styrene content and a Mooney ML 1+4 viscosity of 105. The latex was stored in a storage tank having a capacity of about 45,000 gallons after it had passed through the steam-stripping column.

A second latex having a low Mooney ML1+4 viscosity and a high bound styrene content was also synthesized in a reactor system similar to the one used in making the high viscosity latex. The reactor chain configuration used in synthesizing the low viscosity latex is described in the following table:

| | | | | Agitration | |
|---|---|---|---|---|---|
| RV | Type | Vol (gal) | Pzm Temp (deg F.) | Impeller Type | Speed (rpm) |
| 0 | Tubular | 150 | 63 | | |
| 1 | CSTR | 3750 | 50 | Axial Flow Turbine | 107 |
| 2 | CSTR | 3750 | 50 | Axial Flow Turbine | 107 |
| 3 | CSTR | 3750 | 50 | Brumagin | 71 |
| 4 | CSTR | 7500 | 50 | Brumagin | 71 |
| 5 | CSTR | 7500 | 50 | Brumagin | 71 |
| 6 | CSTR | 3750 | 50 | Axial Flow Turbine | 107 |
| 7 | CSTR | 3750 | 50 | Axial Flow Turbine | 107 |
| 8 | CSTR | 3750 | 50 | Axial Flow Turbine | 107 |
| 9 | CSTR | 3750 | 50 | Axial Flow Turbine | 107 |

The following streams were charged to this reactor configuration continuously:

| | Mass Flow Rate (lbs/min) | Steam Composition (%) |
|---|---|---|
| First Stage: Streams added to tubular reactor | | |
| Butadiene Monomer: | 38.02 | |
| 1,3-butadiene | | 90.00 |
| impurities (mixed butenes, isobutylene, 4-vinylcyclohexene, et al) | | 10.00 |
| Styrene Monomer: | 54.10 | |
| Styrene | | 91.00 |
| Impurities (4-vinylcyclohexene, ethylbenzene, mixed xylenes, et al) | | 9.00 |
| Soap Solution: | 40.62 | |
| soft water | | 79.33 |
| 45% aqueous solution of potassium hydroxide | | 2.04 |
| 40% aqueous solution of tripotassium phosphate | | 2.06 |
| 20% aqueous solution of sodium hydroxide | | 1.71 |
| mixed hydrogenated tallow fatty acid | | 8.21 |
| 47% aqueous solution of sodium napthelene sulfonate | | 1.70 |
| potassium soap of disproportionated tall oil rosin (80% active) | | 1.95 |
| 23% aqueous solution of sodium dodecyl-benzene sulfonate | | 3.00 |
| Soft Water: | 217.15 | 100.00 |
| Initiator: | 0.20 | |
| pinane hydroperoxide (44% active) | | 100.00 |
| Activator Solution: | 17.68 | |
| soft water | | 98.69 |
| 20% aqueous solution of ferrous sulfate | | 0.41 |
| 40% aqueous solution of tetrasodium ethylene-diaminetetraacetate | | 0.56 |
| sodium formaldehyde sulfoxylate | | 0.34 |
| Modifier (Chain Transfer Agent): | 0.19 | |
| tertiary dodecylmercaptan | | 100.00 |
| Oxygen Scavenger Solution: | 0.65 | |
| soft water | | 97.00 |
| sodium hydrosulfite | | 3.00 |

-continued

| | Mass Flow Rate (lbs/min) | Steam Composition (%) |
|---|---|---|
| Second Stage: Streams added to third CSTR | | |
| Butadiene Monomer: | 25.34 | |
| 1,3-butadiene | | 90.00 |
| impurities (mixed butenes, isobutylene, 4-vinylcyclohexene, et al) | | 10.00 |
| Styrene Monomer: | 36.07 | |
| styrene | | 91.00 |
| impurities (4-vinylcyclohexene, ethylbenzene, mixed xylenes, et al) | | 9.00 |
| Modifier (Chain Transfer Agent): | 0.12 | |
| tertiary dodecylmercaptan | | 100.00 |
| Shortstop: Added after 9th CSTR at 62% conversion (or 21.6% solids) | 13.31 | |
| soft water | | 97.08 |
| 85% aqueous solution of diethylhydroxylamine | | 0.38 |
| 40% aqueous solution of sodium dimethyl-dithiocarbamate | | 0.80 |
| 47% aqueous solution of sodium napthelene sulfonate | | 0.89 |
| 45% aqueous solution of potassium hydroxide | | 0.85 |
| Defoamer: Added to latex during monomer recovery operations | 0.05 | |
| Nalco-Exxon EC9060A defoamer | | 100.00 |

After unreacted monomers were removed from this stable latex by steam-stripping, it was found to have a solids content of 20.5 percent, a 50.6 percent bound styrene content and a Mooney ML1+4 viscosity of 13.

A blend of 222,646 lbs (100992 kg) of the high viscosity latex and 184,828 lbs (83,838 kg) of the low viscosity latex (55 percent:45 percent dry weight blend) was made in an agitated tank. Added to the latex blend was 2105 lbs (955 kg) of a 50 percent active Goodyear Wingstay® C antioxidant emulsion.

This latex was coagulated and dried using a conventional continuous process.

The latex was coagulated at a rate of 800 lb/min (362 kg/min). Sulfuric acid was added to the coagulation tank to maintain a pH of 3.7. Also added to the coagulation tank were brine (23 percent aqueous solution of sodium chloride) at 29 lb/mn (13 kg/min) and PM1969 ethyleneamine mixture from Union Carbide at 0.06 lb/min. The polymer crumb was rinsed of coagulants, then dewatered in a single-screw extruder. The polymer was then dried in a single-pass, gas-fired apron drier at 210° F. to less than 0.5 percent moisture content. The final polymer had a bound styrene content of 35.7 percent and a Mooney ML1+4 viscosity of 52.

EXAMPLES 11–13

In this experiment, a blend of a high molecular weight emulsion SBR made by conventional emulsion polymerization and a low molecular weight emulsion SBR made by conventional emulsion polymerization was made and compounded into a standard silica reinforced tire tread rubber. This rubber was cured and its physical properties were compared to similar rubber compounds made with standard emulsion SBR and standard solution SBR. The high molecular weight SBR in the blend contained 23.5 percent bound styrene and had a Mooney ML 1+4 viscosity of about 111. The low molecular weight SBR in the blend contained 50 percent bound styrene and had a Mooney ML 1+4 viscosity of about 15. The weight ratio of high molecular weight SBR to low molecular weight SBR in the blend was 50:50.

The rubber compounds were made by mixing 70 parts of the three different SBR rubbers with 37.5 parts of high cis-1,4-polybutadiene rubber (containing 7.5 parts of highly aromatic processing oil), 60 parts of silica, 10 parts of N330 carbon black, 26.25 parts of highly aromatic processing oil, 2 parts of Agerite Resin D antioxidant (polymerized 1,2-dihydro-2,24-trimethylquinoline), 3 parts of zinc oxide, 1.25 parts of Wingstay® 100 para-phenylene diamine antioxidant, 1.8 parts of N-cyclohexyl-2-benzothiazole sulfenamide, 1.45 parts of diphenylguanidine accelerator and 1.6 parts of sulfur. The rubber formulations were then cured and evaluated to determine physical properties. The tan delta of the cured rubber blends at 0° C. and 60° C. is reported in Table III. Tan delta is measured using a dynamic mechanical tester in tensile mode at 11 Hz and at a strain range from 0.01 percent to 15 percent.

TABLE III

| Example | Tan Delta @ 0° C. | Tan Delta @ 60° C. |
|---|---|---|
| 11 - New Emulsion SBR | 0.26 | 0.06 |
| 12 - Standard Solution SBR | 0.09 | 0.07 |
| 13 - Standard Emulsion SBR | 0.11 | 0.07 |

The use of the emulsion SBR blend of this invention in the silica loaded compounded rubber resulted in a high tan delta value at 0° C. and a low tan delta value at 60° C. This is indicative of good traction characteristics, rolling resistance and treadwear. In fact, the cured rubber blend made with the emulsion rubber of this invention had a tan delta value at 0° C. which was higher than the cured rubber sample made with the conventional emulsion SBR. Remarkably, the cured rubber blend made with the emulsion rubber of this invention also had a tan delta value at 60° C. which was virtually the same as the cured rubber sample made with the standard solution SBR.

The styrene-butadiene rubber of this invention will normally have a tan delta at 0° C. which is within the range of 0.20 to 0.40 and a tan delta at 60° C. which is within the range of 0.03 to 0.10 after being cured in a rubber blend containing 70 parts by weight of the styrene-butadiene rubber, 30 parts by weight of high cis-1,4-polybutadiene rubber, 33.75 parts by weight of highly aromatic processing oil, 60 parts of silica, 10 parts of N330 carbon black, 2 parts of Agerite Resin D antioxidant (polymerized 1,2-dihydro-2,24-trimethylquinoline), 3 parts of zinc oxide, 1.25 parts of Wingstay® 100 para-phenylene diamine antioxidant, 1.8 parts of N-cyclohexyl-2-benzothiazole sulfenamide, 1.45 parts of diphenylguanidine accelerator and 1.6 parts of sulfur. In most cases the styrene-butadiene rubber compositions of this invention will have a tan delta at 0° C. which is within the range of 0.22 to 0.35 and a tan delta at 60° C. which is within the range of 0.04 to 0.08 after being cured in such a rubber blend. It is generally preferred or the styrene-butadiene rubber compositions of this invention will have a tan delta at 0° C. which is within the range of 0.25 to 0.27 and a tan delta at 60° C. which is within the range of 0.05 to 0.07 after being cured in such a rubber blend.

While certain representative embodiments and details have been shown for the purpose of illustrating the subject invention, it will be apparent to those skilled in this art that various changes and modifications can be made therein without departing from the scope of the subject invention.

What is claimed is:

1. An emulsion styrene-butadiene rubber composition which is made by a process which comprises coagulating a latex composition which is comprised of (a) water, (b) an emulsifier, (c) a high molecular weight styrene-butadiene rubber having a weight average molecular weight of at least about 300,000 and (d) a low molecular weight styrene-butadiene rubber having a weight average molecular weight of less than about 280,000; wherein the ratio of the high molecular weight styrene-butadiene rubber to the low molecular weight styrene-butadiene rubber is within the range of about 80:20 to about 25:75; wherein the bound styrene content of the high molecular weight styrene-butadiene rubber differs from the bound styrene content of the low molecular weight styrene-butadiene rubber by at least 5 percentage points; and wherein the high molecular weight styrene butadiene rubber and/or the low molecular weight styrene butadiene rubber contain repeat units that are derived from a hydroxy alkyl acrylate monomer.

2. An emulsion styrene-butadiene rubber composition as specified in claim 1 wherein the bound styrene content of the high molecular weight styrene-butadiene rubber differs from the bound styrene content of the low molecular weight styrene-butadiene rubber by at least 10 percentage points; and wherein the high molecular weight styrene-butadiene rubber has a weight average molecular weight which is within the range of about 400,000 to about 1,750,000 and wherein the low molecular weight styrene-butadiene rubber has a weight average molecular weight which is within the range of about 70,000 to about 270,000.

3. An emulsion styrene-butadiene rubber composition as specified in claim 2 wherein the bound styrene content of the high molecular weight styrene-butadiene rubber differs from the bound styrene content of the low molecular weight styrene-butadiene rubber by at least 15 percentage points; wherein the high molecular weight styrene-butadiene rubber has a weight average molecular weight which is within the range of about 1,000,000 to about 1,500,000; and wherein the low molecular weight styrene-butadiene rubber has a weight average molecular weight which is within the range of about 120,000 to about 260,000.

4. An emulsion styrene-butadiene rubber composition as specified in claim 2 wherein the styrene-butadiene rubber composition has a number average molecular weight as determined by field flow fractionation which is within the range of about 50,000 to 150,000, and wherein the styrene-butadiene rubber has a light scattering to refractive index ratio which is within the range of 1.8 to 3.9.

5. An emulsion styrene-butadiene rubber composition as specified in claim 2 wherein said hydroxy alkyl acrylate monomer has a structural formula selected from the group consisting of:

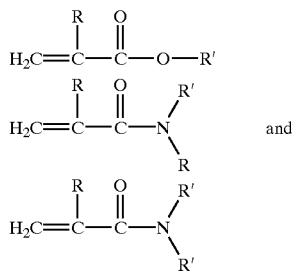

wherein R represents hydrogen atoms or alkyl groups containing from 1 to about 8 carbon atoms, and wherein R' represents hydroxyalkyl groups containing from about 2 to about 8 carbon atoms.

6. An emulsion styrene-butadiene rubber composition as specified in claim 2 wherein the hydroxy alkyl acrylate is selected from the group consisting of 2-hydroxyethyl (meth) acrylate, 2-hydroxypropyl (meth)-acrylate, 3-hydroxypropyl (meth)acrylate, 3-chloro-2-hydroxypropyl (meth)acrylate, 3-phenoxy-2-hydroxypropyl (meth)acrylate, glycerol mono (meth)acrylate, hydroxybutyl (meth)acrylate, 3-chloro-2-hydroxypropyl (meth)-acrylate, hydroxyhexyl (meth) acrylate, hydroxyoctyl (meth)acrylate, hydroxymethyl (meth)acrylamide, 2-hydroxyethyl(meth)acrylamide, 2-hydroxypropyl(meth)-acrylamide, 3-hydroxypropyl (meth)acrylamide, di-(ethyl-ene glycol) itaconate, di-(propylene glycol) itaconate, bis(2-hydroxypropyl) itaconate, bis(2-hydroxyethyl) itaconate, bis(2-hydroxyethyl) fumarate, bis(2-hydroxy-ethyl) maleate, and hydroxy-methyl vinyl ketone.

7. An emulsion styrene-butadiene rubber composition as specified in claim 2 wherein the hydroxy alkyl acrylate is selected from the group consisting of hydroxymethyl (meth) acrylate, 2-hydroxyethyl(meth)-acrylate, 2-hydroxypropyl (meth)acrylate, 3-hydroxy-propyl (meth)acrylate, 3-phenoxy-2-hydroxypropyl (meth)acrylate, glycerol mono (meth)acrylate, hydroxy-butyl (meth)acrylate, hydroxy-hexyl (meth)acrylate, hydroxyoctyl (meth)acrylate, hydroxymethyl(meth)acryl-amide, 2-hydroxyethyl(meth) acrylamide, 2-hydroxypropyl-(meth)acrylamide, and 3-hydroxypropyl(meth)acrylamide.

8. An emulsion styrene-butadiene rubber composition as specified in claim 2 wherein the hydroxy alkyl acrylate is selected from the group consisting of hydroxymethyl (meth) acrylate, 2-hydroxyethyl (meth)acrylate, and 3-hydroxypropyl (meth)acrylate.

9. An emulsion styrene-butadiene rubber composition as specified in claim 2 wherein the hydroxy alkyl acrylate is hydroxypropylmethacrylate.

10. An emulsion styrene-butadiene rubber composition as specified in claim 2 wherein the hydroxy alkyl acrylate is a mixture of 2-hydroxypropylmethacrylate and 3-hydroxypropylmethacrylate.

11. An emulsion styrene-butadiene rubber composition as specified in claim 2 wherein the bound hydroxy alkyl acrylate monomer in the styrene-butadiene rubber is present at a level which is within the range of about 0.1 weight percent to about 15 weight percent.

12. An emulsion styrene-butadiene rubber composition as specified in claim 2 wherein the bound hydroxy alkyl acrylate monomer in the styrene-butadiene rubber is present at a level which is within the range of about 0.5 weight percent to about 10 weight percent.

13. An emulsion styrene-butadiene rubber composition as specified in claim 3 wherein the bound hydroxy alkyl acrylate monomer in the styrene-butadiene rubber is present at a level which is within the range of about 1 weight percent to about 8 weight percent.

14. An emulsion styrene-butadiene rubber composition as specified in claim 4 wherein the bound hydroxy alkyl acrylate monomer in the styrene-butadiene rubber is present at a level which is within the range of about 3 weight percent to about 5 weight percent.

15. An emulsion styrene-butadiene rubber composition as specified in claim 14 wherein the number average molecular weight as determined by field flow fractionation that is within the range of about 60,000 to 145,000.

16. An emulsion styrene-butadiene rubber composition as specified in claim 15 wherein the styrene-butadiene rubber has a light scattering to refractive index ratio that is within the range of 2.0 to 3.8.

17. An emulsion styrene-butadiene rubber composition as specified in claim 16 wherein the number average molecular weight as determined by field flow fractionation which is within the range of about 75,000 to 140,000.

18. An emulsion styrene-butadiene rubber composition as specified in claim 17 wherein a plot of log frequency versus elastic modulus of the styrene-butadiene rubber composition crosses over a plot of log frequency versus loss modulus of the styrene-butadiene rubber composition at a frequency within the range of 0.001 radians per second to 100 radians per second when conducted at 90° C. to 120° C. using parallel plate geometry in the dynamic oscillation frequency sweep of the styrene-butadiene rubber.

19. A tire having a tread that is comprised of the styrene-butadiene rubber composition specified in claim 1.

20. A tire as specified in claim 19 wherein the tread is further comprised of a filler selected from the group consisting of carbon black and silica; wherein the tread is further comprised of a rubber selected from the group consisting of natural rubber, high cis-1,4-polybutadiene rubber, high vinyl polybutadiene rubber, medium vinyl polybutadiene rubber, high trans-1,4-polybutadiene rubber, solution styrene-butadiene rubber, styrene-isoprene-butadiene rubber, styrene-isoprene rubber, isoprene-butadiene rubber and 3,4-polyisoprene rubber; and wherein the tread is cured with sulfur.

* * * * *